United States Patent [19]
Hirayama et al.

[11] Patent Number: 5,922,078
[45] Date of Patent: Jul. 13, 1999

[54] METHOD AND APPARATUS FOR RECOVERING FROM FAULTS IN DISTRIBUTED MEMORY TYPE MULTIPROCESSOR COMPUTING SYSTEMS

[75] Inventors: Hideaki Hirayama, Kanagawa-ken; Hiroshi Sakai, Tokyo, both of Japan

[73] Assignee: Kabushiki Kaisha Toshiba, Kawasaki, Japan

[21] Appl. No.: 08/820,528

[22] Filed: Mar. 19, 1997

[30] Foreign Application Priority Data

Mar. 19, 1996 [JP] Japan .................................. 8-063407

[51] Int. Cl.[6] .................................................. G06F 11/14
[52] U.S. Cl. .................................................. 714/16
[58] Field of Search ........................ 395/182.15, 182.14, 395/182.13, 182.02, 182.03; 364/285.2

[56] References Cited

U.S. PATENT DOCUMENTS

| | | | |
|---|---|---|---|
| 5,301,309 | 4/1994 | Sugano | 395/575 |
| 5,603,020 | 2/1997 | Hashimoto et al. | 395/616 |
| 5,630,047 | 5/1997 | Wang | 395/182.15 |
| 5,664,088 | 9/1997 | Romanovsky et al. | 395/182.13 |

OTHER PUBLICATIONS

Bhargava et al., "Independent Checkpointing and Concurrent Rollback for Recovery in Distributed Systems—An Optimistic Approach", IEEE Publication, pp. 3–12, 1988.

Plank et al., "ICKP: A Consistent Checkpointer for Multicomputers", IEEE Publication, pp. 62–67, 1994.

*Primary Examiner*—Robert W. Beausoliel, Jr.
*Assistant Examiner*—Scott T. Baderman
*Attorney, Agent, or Firm*—Finnegan, Henderson, Farabow, Garrett & Dunner, L.L.P.

[57] ABSTRACT

The distributed memory type multiprocessor computing system according to the present invention includes a plurality of nodes which are coupled with each other so as to correspond to a tree construction by communicating switches. Each of nodes acquires checkpoints at a predetermined time for reexecuting the respective data processing from a previously acquired checkpoint when a fault occurred. Each of nodes starts the checkpoint acquisition in synchronous with all another nodes by prohibiting data transfer through the communication switch to another nodes and by making completion of data reception through the communication switch for keeping vacant state which no data exist in the communication switch.

11 Claims, 26 Drawing Sheets

Fig. 9 (a) MAKE CORRESPONDENCE TO BINARY TREE CONSTRUCTION
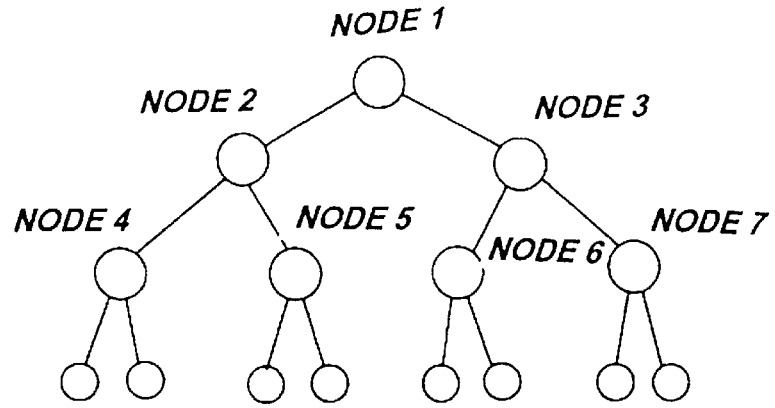
Fig. 9 (b) INFORMATION FLOW OF CHECKPOINT FINISH PREPARATION COMPLETION
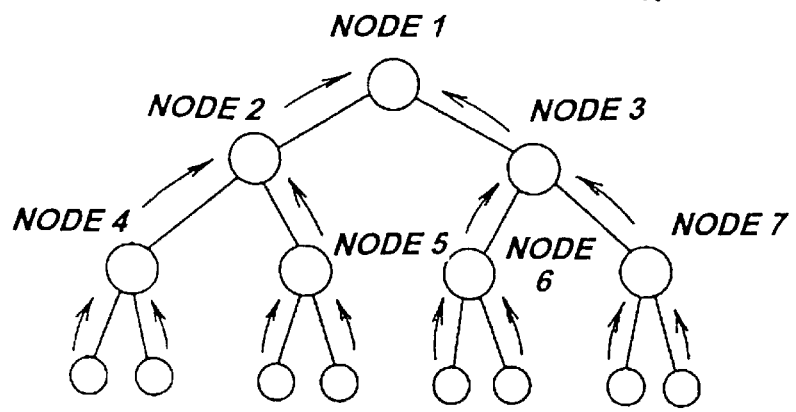
Fig. 9 (c) INSTRUCTION FLOW OF CHECKPOINTCOMPLETION
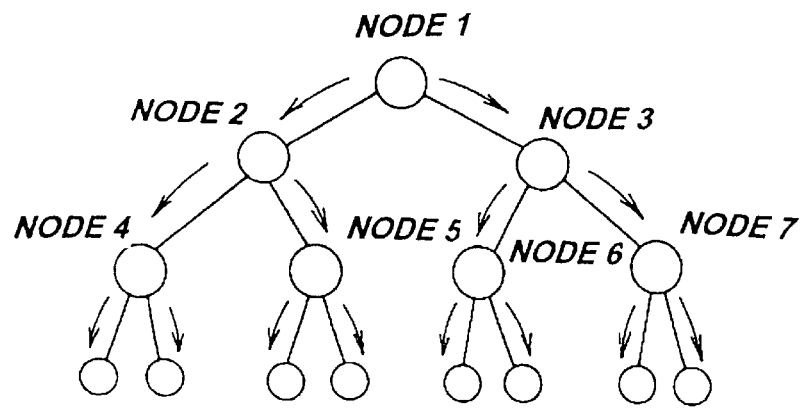

Fig. 15(a) FAULT INFORMATION FLOW
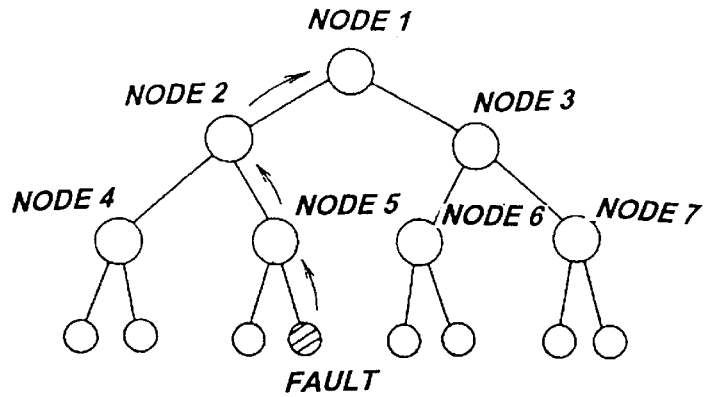
Fig. 15(b) INFORMATION FLOW WHEN TWO FAULTS OCCUR AT DIFFERENT NODES
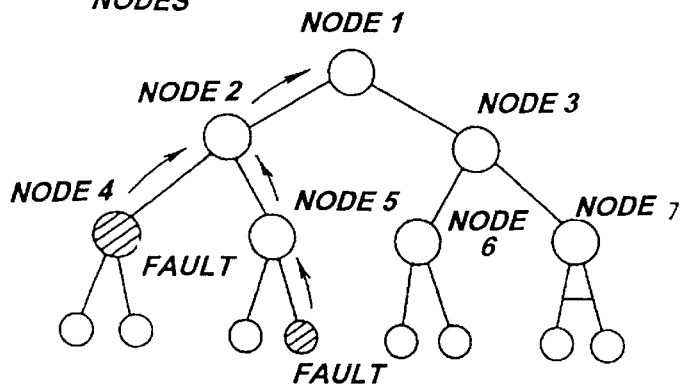
Fig. 15(c) ROLLBACK INSTRUCTION FLOW
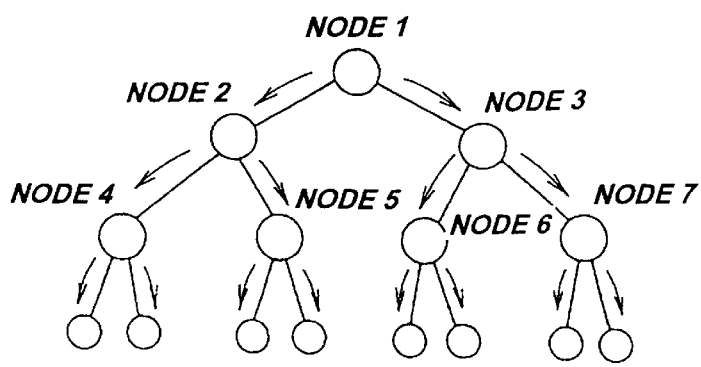

Fig. 16(a) INFORMATION FLOW OF CHECKPOINT
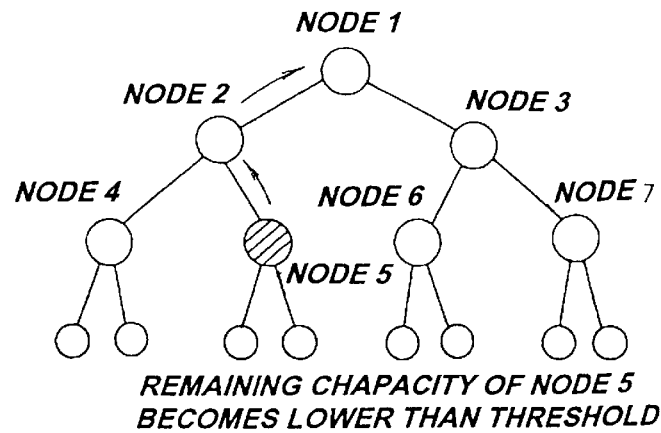
REMAINING CHAPACITY OF NODE 5
BECOMES LOWER THAN THRESHOLD
Fig. 16(b) INSTRUCTION FLOW OF CHECKPOINT
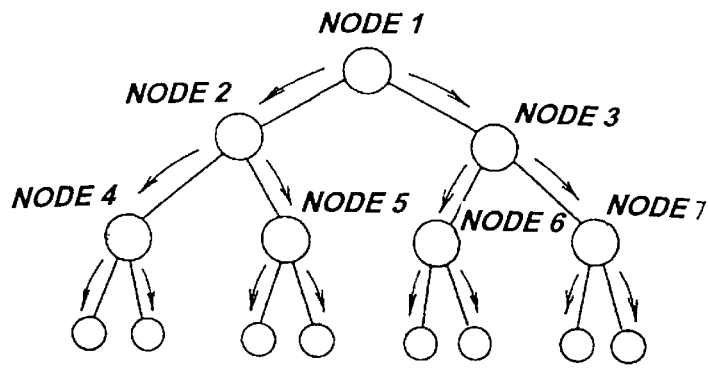
Fig. 16(c) INSTRUCTION FLOW OF CKP ACQUISITION (ANOTHER METHOD)
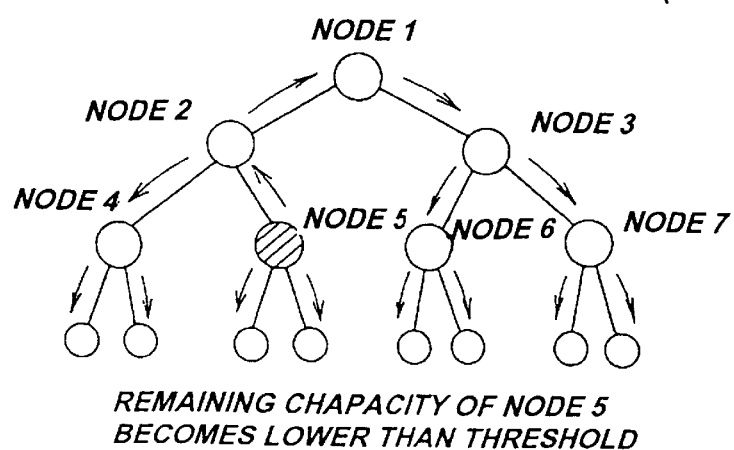
REMAINING CHAPACITY OF NODE 5
BECOMES LOWER THAN THRESHOLD

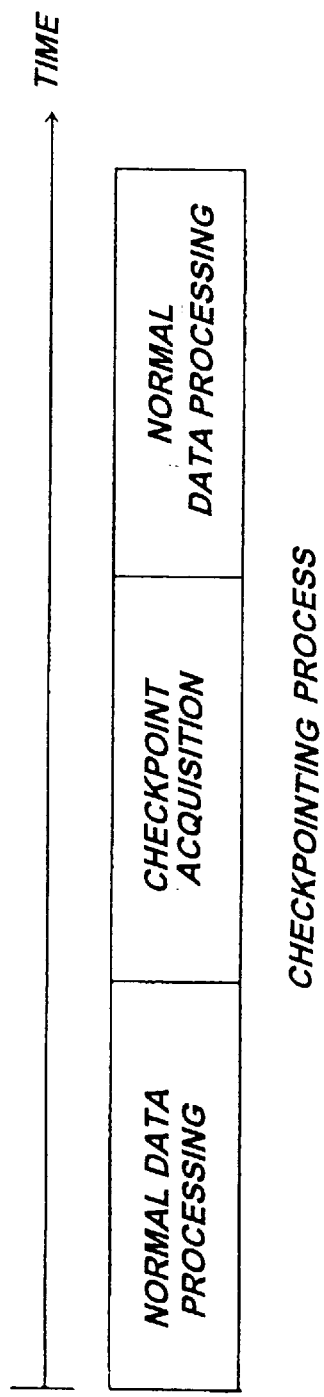
Fig. 22(a) PRIOR ART
Fig. 22(b)

METHOD AND APPARATUS FOR RECOVERING FROM FAULTS IN DISTRIBUTED MEMORY TYPE MULTIPROCESSOR COMPUTING SYSTEMS

BACKGROUND OF THE INVENTION

1. Field of the Invention

The present invention relates to method and apparatus for recovering from faults in a distributed memory multiprocessor computing system, and more particularly to fault recovery in a checkpointing and rollback type fault tolerant computing system of a distributed memory type multinode system.

In particular, this invention relates to method and apparatus for communicating message to another node with avoiding delay among the distributed nodes in a large scale multinode computing system for achieving fault tolerance by checkpointing and rollback recovery

2. Discussion of the Background

Distributed multinode computing systems are used in large scale computing fields, such as large scale science technical computing or data processing. The distributed multinode computer is required a higher reliability of the total system.

In case of that each of computing nodes is used as a server computer in a large scale distributed computing network, it is extremely important to maintain the higher reliability of the total system.

Checkpointing and rollback recovery is a technique for achieving the higher reliability in computing systems. The basic function of the checkpointing and rollback recovery is shown in FIG. 26. A processor in the system executes normal data processing with periodically acquiring checkpoints CKP0, CKP1, . . . and when a fault is detected during the data processing DTP1, the processor rolls back the data processing DTP1 to a previous checkpoint CKP1 which has acquired just before the occurrence of the fault. After causality of the fault is eliminated, the processor restarts the data processing from that checkpoint CKP1.

When the checkpointing and rollback recovery computers are used in a large scale data processing system, a higher reliability of the total system can be basically achieved by the checkpointing and rollback recovery function in each of the distributed nodes.

Usually, such a large scale distributed multinode computing system includes a multiplicity of nodes of several hundreds to several thousands number. The total reliability of the multinode system can be obtained by multiplication of the respective reliability of each of nodes. When the system includes 1024 nodes and each of nodes performs about 99.99% reliability, the total reliability of the system is 90.27%. As apparently, as the more increased number of element nodes are included in the system, the lower reliability of the total system is obtained. The increasing of the node number deteriorates the total system.

For improving this defect, it has been considered to increase the reliability/availability factor of each node in the system. For example, it the availability factor of each node becomes 99.999%, the total availability factor of the system can be improved up to 98.98%.

However, when checkpointing and rollback recovery type computers are used in a distributed multinode computing system, there is another serious problem to be solved. That is latency of message communication among a plurality of nodes which are commonly coupled through a communication path. The causality of the latency of message communication among a plurality of nodes will be explained with reference to FIGS. 27–29.

FIG. 27 shows a message communication between two nodes. During the checkpointing and rollback recovery computer A executing a normal processing after acquiring a checkpoint CKP1, another computer B sends a request message (a) to the computer A through a communication line. The computer A immediately executes the requested process and sends back a reply(b) to the computer B immediately. After that, at the time T2, a fault FLT1 is detected in the computer A. The computer A rolls back its processing to the pervious checkpoint CKP1 by cancelling all of the data processing which has been previously executed from the checkpoint. In this case, the computer B must resend the request(a) to the computer A during a restarted execution for maintaining consistency of the state. However, since the computer B has already received the reply from the computer A, it can't recognize the roll back operation by the computer A and does not send the request message during the restarted execution. Consequently, inconsistent state occurs between the computers A and B.

For avoiding the inconsistency between the computers, delay sending of the reply message is inevitable for the processing in the computer A. For doing so, the computer A holds the executed result of the request into a holding block (c) as shown in FIG. 28. When the computer A acquires a next checkpoint CKP2 at a time T3 in FIG. 29, the message in the block (c) is communicated to the computer B as a reply (b) in response to the request (a). Even if a fault occurs after the time T3, since the computer A rolls back and restarts from the checkpoint CKP2, the reply (b) can be communicated again during the restarted processing. Accordingly, the consistency between the computers A and B can be maintained.

If a fault FLT1 occurs before acquiring of the next checkpoint CKP2 as shown in FIG. 30, the computer B can recognize the abnormal state of the system by detecting a time interval for no reply from the computer A. Since the computer A cancels all of the data processing related to the request(a) when it rolls back to the checkpoint CKP 1, the computer B can send the request (a) again to the computer A during a recovering processing.

It usually takes a half of time delay during one checkpointing interval for message communication between nodes in a distributed multinode computing system. Practically, since it takes several milliseconds for one checkpointing interval, it needs for each of message communications between two computers to have a delay of at least more than one millisecond. This delay of message communication between nodes deteriorates the total performance of the multiprocessor system. In particular, when the message communication among the nodes are frequently occurred in the system, the total performance of the multiprocessor system is extremely deteriorated because of its overhead for a checkpointing.

SUMMARY OF THE INVENTION

Accordingly, it is an object of the present invention to provide method and apparatus for achieving a high speed message communication among a plurality of nodes in a checkpointing and rollback recovery type distributed multinode computing system.

It is another object of this invention to provide a checkpointing and rollback recovery type multinode system of a high speed message communication among nodes with reducing its overhead for each of the checkpoint acquisition time.

It is still another object of this invention to provide method and apparatus for performing synchronous checkpointing of different processes in a plurality of nodes.

It is still another object of this invention to provide method and apparatus for synchronously acquiring a checkpoint at the same time when no transmitting message exists in a communication path.

In the multinode computing system in accordance with the present invention comprising of a plurality of nodes and a communication path which are commonly coupled to the nodes, each of nodes includes at least one processor, main memory, a cache memory and a before-image-buffer for executing a data processing with acquiring checkpoints periodically and for restarting the processing form a previous checkpoint for recovering when a fault is detected, the multinode system is characterized in that all of nodes in the system acquire a checkpoint synchronously at the same time when no message exists in the communication path by prohibiting message transfer before acquiring a next checkpoint.

The distributed multinode computing system in accordance with the present invention is characterized in that all of nodes in the system acquire synchronously checkpoints during no transmitting data exist in the communication path. If a fault occurs, the system restarts the data processing by rolling back a checkpoint with maintaining no message existing state of the communication path.

The distributed multinode computing system in accordance with the present invention is characterized in that no message transfer is executed until all of nodes in the system acquires a respective checkpoint. This eliminates a necessity for keeping the state of the communication path.

The distributed multinode computing system in accordance with the present invention is characterized in that all of nodes acquire checkpoint synchronously and when a fault occurs in a node, the fault occurrence is synchronously informed to all of nodes before acquiring a next checkpoint and that each of node transfers messages other than I/O, message to another node without any delay.

The distributed multinode computing system in accordance with the present invention is characterized in that each of nodes includes an associated main memory for synchronously acquiring checkpoints and a cache memory for copying back the stored dirty data during the data processing before acquisition of the checkpoint into the main memory.

The distributed multinode computing system in accordance with the present invention is characterized in that all of nodes in the system begin to acquire a checkpoint from a predetermined particular time for synchronizing the checkpointing operation among the nodes for avoiding its overhead for checkpoint acquisition.

The distributed multinode computing system in accordance with the present invention is characterized in that all of nodes are respectively connected so as to construct a tree-constructed communication path for transferring data for synchronously acquiring checkpoints between a root node and associated child node. An instruction for starting checkpoint acquisition from a node is transferred to all of nodes in the system through the tree-constructed communication path.

All of the child nodes send information for completion of preparation for a checkpoint acquisition to an associated root node successively and an instruction of a checkpoint acquisition is communicated to all child nodes.

The distributed multinode computing system in accordance with the present invention is characterized in that the system includes a barrier synchronizing mechanism for detecting that all of nodes have completed its checkpoint acquisition.

The distributed multinode computing system in accordance with the present invention is characterized in that the all of nodes in the system are divide into a plurality of application groups for executing different application with depending each of groups. Each of the groups can select whether or not the checkpoint acquisition process should be performed for reducing overhead of the process.

BRIEF EXPLANATION OF THE DRAWINGS

A more complete appreciation of the present invention and many of the attendant advantages thereof will be obtained by reference to the following detailed description when considered in connection with the accompanying drawings, wherein:

FIG. 9(a) is a binary tree for logically connecting a plurality of nodes.

FIG. 9(b) is a binary tree for explaining communication flows as to the completion of checkpoint acquiring preparations.

FIG. 9(c) is a binary tree for explaining communication flows as to the completion of checkpoint acquisition.

FIGS. 15(a)–15(c) show a binary tree for explaining communications among the nodes when a fault occurred.

FIGS. 16(a)–16(c) show a binary tree for explaining communications among the nodes for synchronizing the starting of checkpoint acquisition.

FIG. 22(a) is a time chart for explaining a conventional checkpoint acquisition process.

FIG. 22(b) is a time chart for explaining a two phased checkpoint acquisition process.

DETAILED EXPLANATION OF THE PREFERRED EMBODIMENTS

Figure 1:
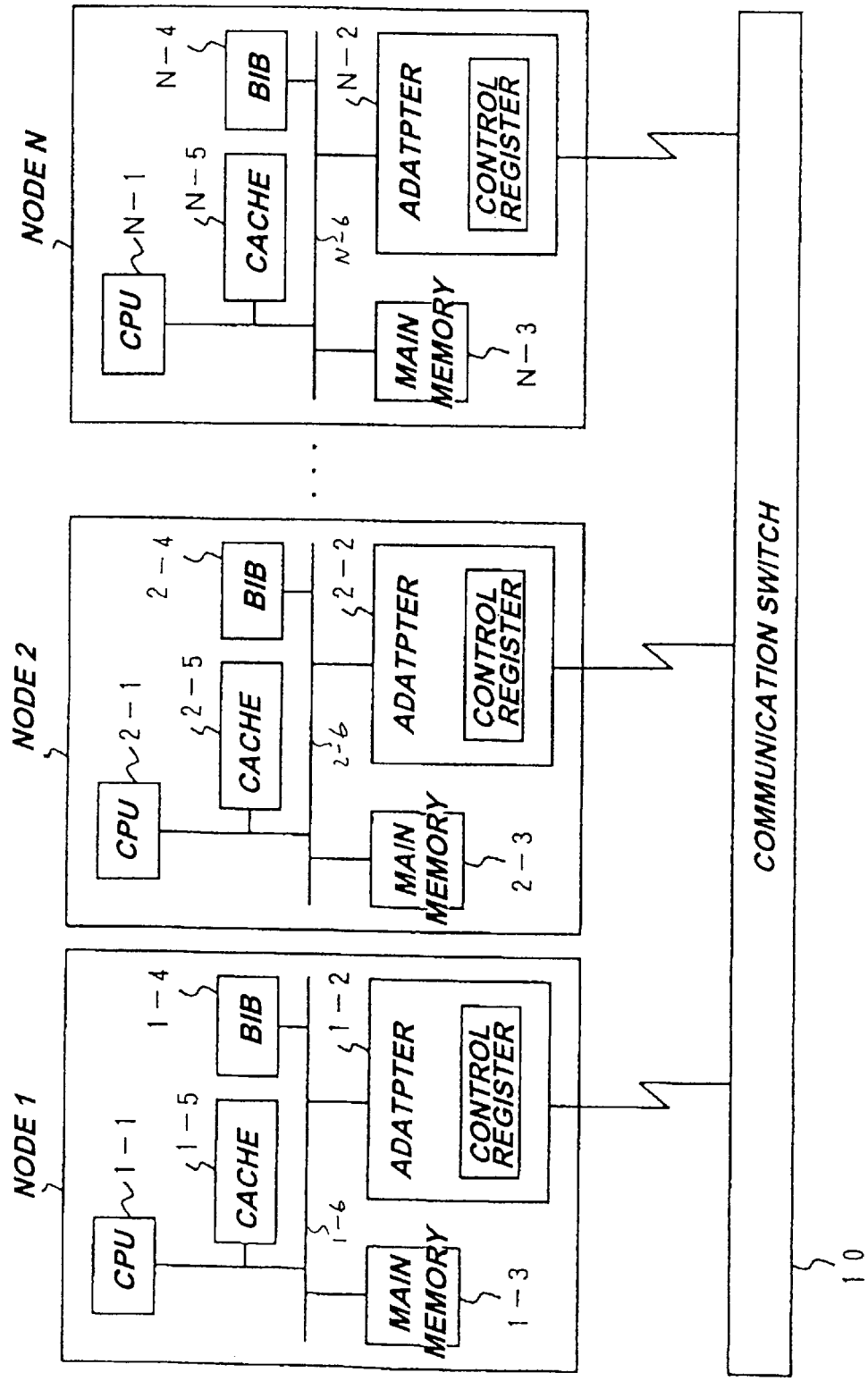
FIG. 1 is a schematic block diagram for explaining a checkpoint rollback type computing system having a distributed memory system.

FIG. 1 shows a schematic block diagram of a preferred first embodiment of a checkpoint and rollback type multiprocessor computing system including a distributed memory system according to the present invention. The multiprocessor computing system is comprised of a plurality of nodes 1, 2, . . . N and a communication switch or path 10 which is commonly coupled to the respective of the plurality of nodes 1, 2, . . . N.

Each of the nodes includes a CPU1, a communication adaptor 2, a main memory 3, a before-image-buffer (hereinafter referred to as a "BIB") 4 and a cache 5. These elements in a respective node are commonly coupled to an internal bus 6. The respective communication adaptor in each of nodes is coupled to the communication switch 10.

Each of the BIB in the respective nodes performs a function for restarting a data processing in the node by acquiring a checkpoint periodically during the data processing. When a fault is detected during the data processing a particular checkpoint, the BIB makes the data processing roll back to a previous checkpoint which has acquired just before the occurrence of the fault.

It is also possible to comprise a node so as to include a plurality of CPUs. And the BIB also is one example device for performing the checkpoint acquisition and rolling back of a data processing when a fault occurs. It can be performed by using a different device or an another method.

Although it is also possible to use a different type of the CPU, the memory of a different capacity and a different operation system in each or the plurality of nodes, it is desirable to use the substantially same type hardware components in each of the nodes from a view point of an easiness for the total system control.

Figure 2:
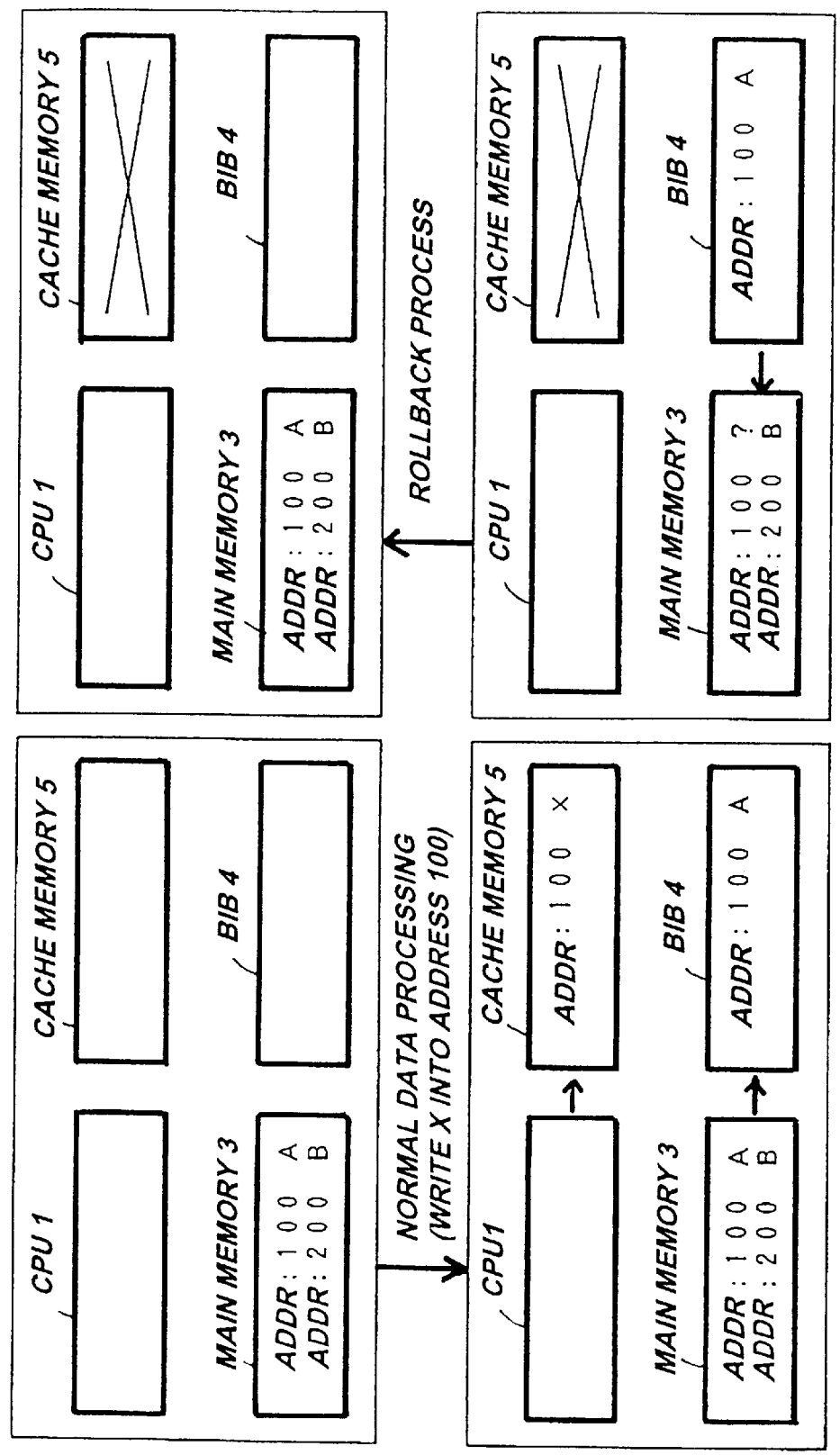
FIG. 2 is a block diagram for explaining operations for storing data and rolling back by using the Before Image Buffer (BIB) shown in FIG. 1.

FIG. 2 explains operations for storing data and for rolling back by using a log memory of BIB (Before Image Buffer) in the respective nodes 1, 2, . . . ,N. When the CPU renewed a data in the cache memory, the BIB detects as to which data has renewed by monitoring a bus command which is delivered into the bus for maintaining a coherency of the cache memory. For example, when the CPU writes a data X at the address 100, the BIB detects the writing in the cache memory and reads out the memory content A at the address 100 in the main memory. Then the BIB stores the original content of the main memory. In case of rolling back to the original memory state when a fault occurred, as shown in FIG. 2, the content in the cache memory is invalidated and the content in the main memory is returned to the original state by using the address and the original data which have been stored in the BIB. When the main memory state rolls back to an original state at a previous checkpoint, the content in the BIB is cleared and the system goes back to a normal data processing.

The respective nodes 1, 2, . . . ,N acquires a checkpoint into the associated main memories 1-3, 2-3, . . . ,N-3 respectively. The data renewal history in the main memory after acquiring the checkpoint is stored into the BIB. By doing so, It becomes possible to make the main memory rolling back to an original state at a previously acquired checkpoint when a fault occurs.

The respective nodes 1, 2, . . . ,N acquires a new checkpoint in the associated main memory as the following steps.

Step A1: A context in the CPU is stored in the main memory. For example, a value in a register in the CPU is stored into the main memory.

Step A2: A renewed data in the cache memory is rewrite into the main memory. Namely, the renewed data is flushed into the main memory.

Step A3: A checkpoint acquisition process is completed by clearing the content in the BIB. Then the system goes back to a normal data processing. If a fault occurs before completing the step A3, the data processing rolls back to a previous checkpoint. If a fault occurs after the completion of the step A3, the data processing rolls back to the newly acquired checkpoint.

After rolling back to a previous checkpoint which has acquired before occurrence of a fault, the data processing restarts as the following steps.

Step B1: The context in the cache is invalidated.

Step B2: The context in the main memory writes back to the state at the previously acquired checkpoint by using the stored address and the original data in the BIB.

Step B3: The data processing restarts by restoring the context stored in the main memory into the CPU.

Next, a communication for transferring data between nodes is explained. The message transfer from a transmitting node to a receiving node is executed under the following steps.

Step C1: A message is written on an associated main memory in a transmitting node.

Step C2: An associated communication adapter in the transmitting node is activated.

Step C3: A routing to receiving node through a communication switch is formed.

Step C4: An associated communication adapter in the receiving node is activated.

Step C5: The transmitted message is stored on an associated main memory in the receiving node.

In the first embodiment, the communication between nodes is performed as a part of execution of the system program. Following are relationship between an application program and the communication controller between nodes. Here, the node 1 is the transmitting node, and the node 2 is the receiving one.

Figure 3:
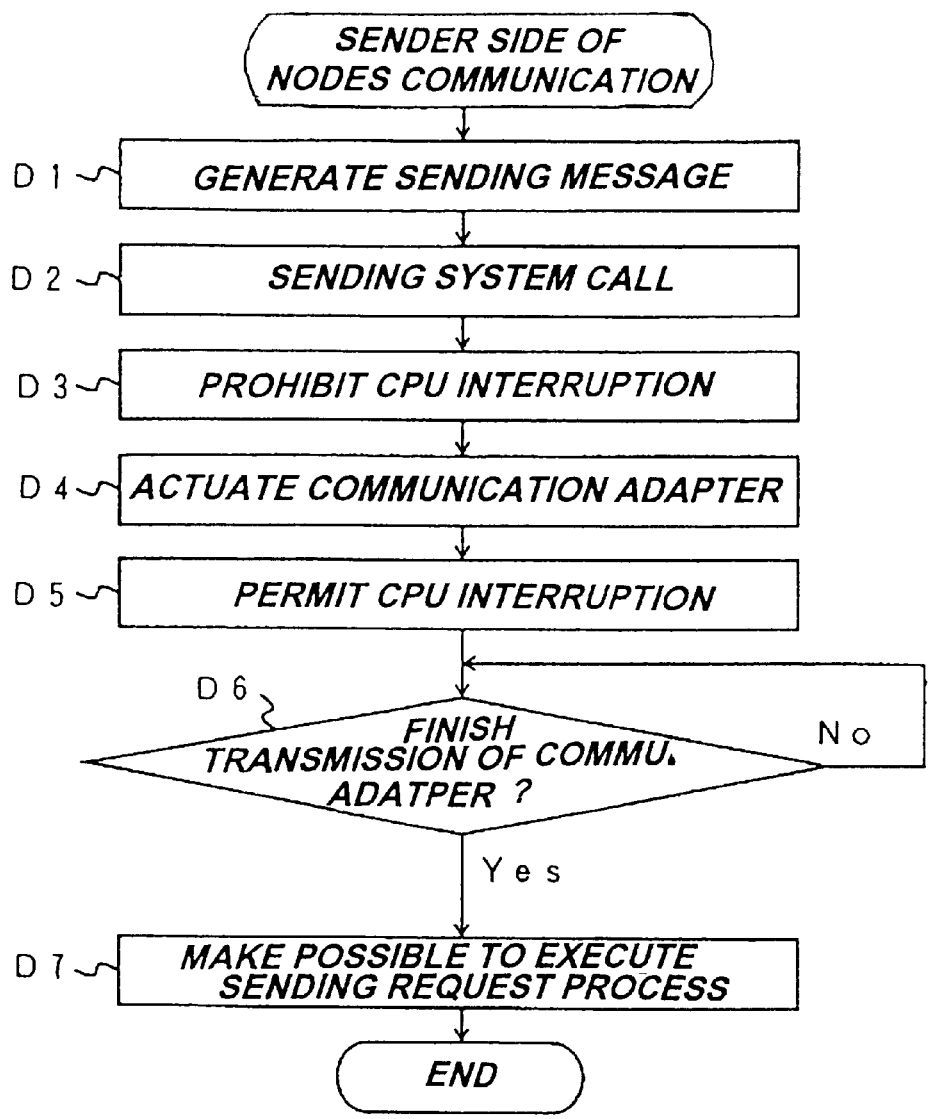
FIG. 3 is a flow chart for explaining operations in a transmitting side for communication among the nodes.

FIG. 3 shows an operation the transmitting node during the communication between nodes.

When an application program instructs to write the transmitting message to the receiving node 2 on the associated main memory 1-3 in the transmitting node 1 (step D1), a transmitting system call is executed for calling the communication controller in the system program (step D2). The communication controller prohibits an interruption by the CPU 1-1 (step D3). The communication adapter is activated after setting control information in an associated control register in the communication adapter for transferring the message to the receiving node 2 (step D4). Then, the prohibition of interruption from the CPU is released (step D5). After confirming a completion of the transmitting operation to the node 2 by checking the finish of the message transaction from the communication adapter (step D6), the communication controller between nodes makes the application program which has requested the message transaction enable to execute (step D7).

Figure 4:
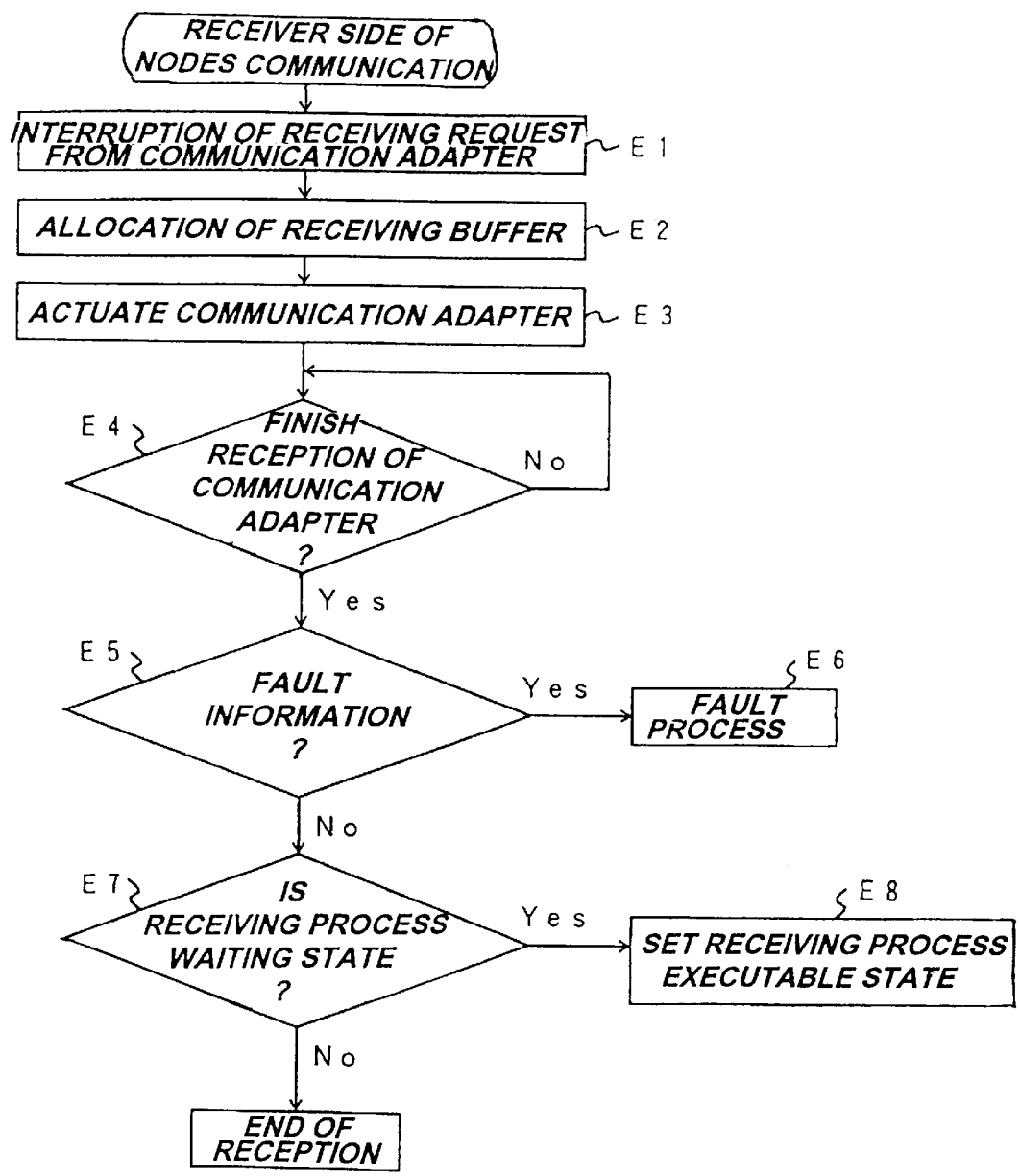
FIG. 4 is a flow chart for explaining operations in a receiving side for communication among the nodes.

FIG. 4 explains an operation the receiving node during the communication between nodes.

When the associated communication adapter 2-2 in the receiving node 2 detects a request for receiving a message from the node 1, the communication controller between nodes starts a receiving process by prohibiting interruption from the CPU (step E1). The communication controller allots a receiving buffer in the main memory 1-3 for storing the message (step E2). The communication adapter is activated after setting control information in the control register for storing the received message into the receiving buffer (step E3). When the communication adapter 2-2 completes the reception of the message (step E4), the communication controller examine whether or not the received message informs an occurrence of a fault (step E5). If yes, the operation jumps to a fault processing and all of nodes roll back to a previous checkpoint for restarting the data processing from the checkpoint (step E6). If no, that is, when the received message relates to a normal data processing, the state of the application program is examined whether it is waiting the reception of the message (step E7). If yes, the application program is enabled to execute (step E8).

The distributed memory type multiprocessor computing system according to the present invention can achieve a high speed message transaction between nodes without awaiting a next checkpoint acquisition when a request of communication between nodes occurs. By achieving this, it needs to take measurements for processing an occurred fault.

The first embodiment of the present invention takes the following measurements M1–M4 for performing a communication between nodes immediately.

M1: All of nodes acquire a respective checkpoint synchronously, Asynchronous acquisition of a checkpoint among a plurality of nodes will be explained in the following third and forth embodiments of the present invention.

M2: when a fault occurs in a node, all of nodes recognize the occurrence of the fault before a completion of a next checkpoint and all of nodes roll back to a previously acquired checkpoint.

M3: An execution of a request other than the communication between nodes, for example, an input/output request to an I/O device or an communication to another computer system, is delayed until completion of a next checkpoint acquisition.

M4: During a checkpoint acquisition process, the transmitting data does not remain in the communication path. That is, when the node 1 begins a checkpoint acquisition process, it is prohibited to transfer data to an another node 2 through a communication switch 10 and also it needs to complete a data receiving operation from another node through the communication switch. By taking this measurement M4, no special process for the communication switch is required even when all of the nodes roll back to a previous checkpoint synchronously.

By taking these measurements, a high speed communication among nodes can be achieved by an immediate execution of the communication request among nodes.

Figure 5:
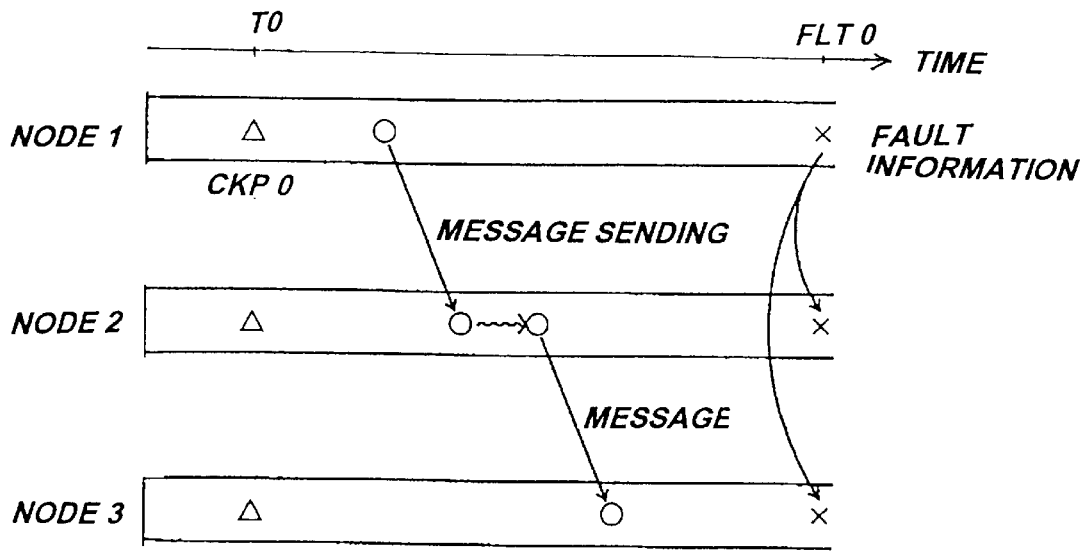
FIG. 5 is an operational timing for explaining a normal message transmission among the nodes.

FIG. 5 shows the first example of the immediate execution of the communication request among nodes. After all of nodes 1–3 acquired a respective checkpoint CKP0 at the time T0, the node 1 transfers a message to the node 2 and then the message is transferred to the node 3. All of the message transfers has completed before a fault FLT0 occurrence in the node 1 at the time T10. Accordingly, when the fault is detected in the node 1, all of nodes can roll back to the checkpoint CKP0 which has synchronously acquired in the respective nodes. The rolling back to the respective checkpoints which have acquired synchronously at the same time by all of nodes, the consistency among the nodes are kept even when a roll back operation is needed after executing a communication among the nodes. Accordingly it becomes possible to execute a communication among nodes without any delay.

Figure 6:
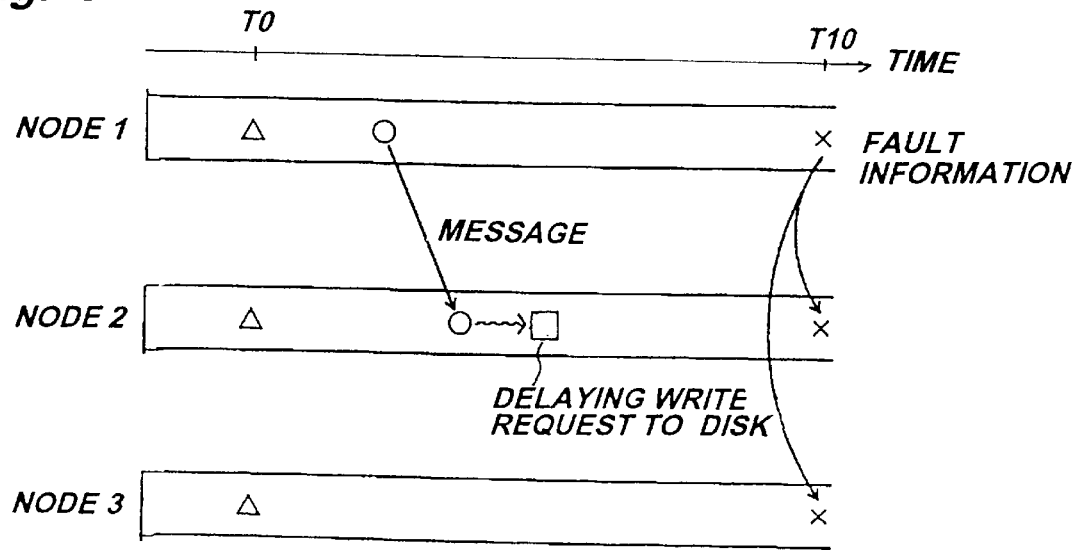
FIG. 6 is an operational timing for explaining another method for transferring a message among the nodes.

FIG. 6 shows a second example of the immediate execution of the communication request among nodes. The node 1 sends a message to the node 2 by a communication between nodes before occurring a fault. The message requests to write data into a disk device in the node 2. As explained above, although the communication between nodes is immediately executed, other than the communication message is delayed until a completion of a next checkpoint acquisition. When a fault is detected in the node 1 at the time T10, the communicated write request has been delayed and the writing into the disk has not yet executed in the node 2. Accordingly when all of nodes roll back to the checkpoint at the time T0, all of the nodes can keep the same state. Accordingly, the consistency among nodes can be maintained even when an immediate message transfer has been executed in a communication among nodes.

The synchronous acquisition of checkpoints in all of nodes are performed as explained in the followings.

A start timing of a checkpoint acquisition is decided among the following timings.

T1: When a predetermined time has passed.

T2: When the remaining capacity of the BIB reaches to a predetermined low value.

T3: When the number of delayed I/O requests reached to a predetermined upper value.

It is possible to select one of the above mentioned timings or to combine two or more timings for deciding the start timing of checkpoint acquisition. In the first embodiment according to the present invention, the timing T1 is selected as a start timing of checkpoint acquisition. By determining the start timing of checkpoint acquisition, it becomes possible to execute data communication between nodes without any adjustment among nodes for synchronizing operations among the nodes.

Figure 7:
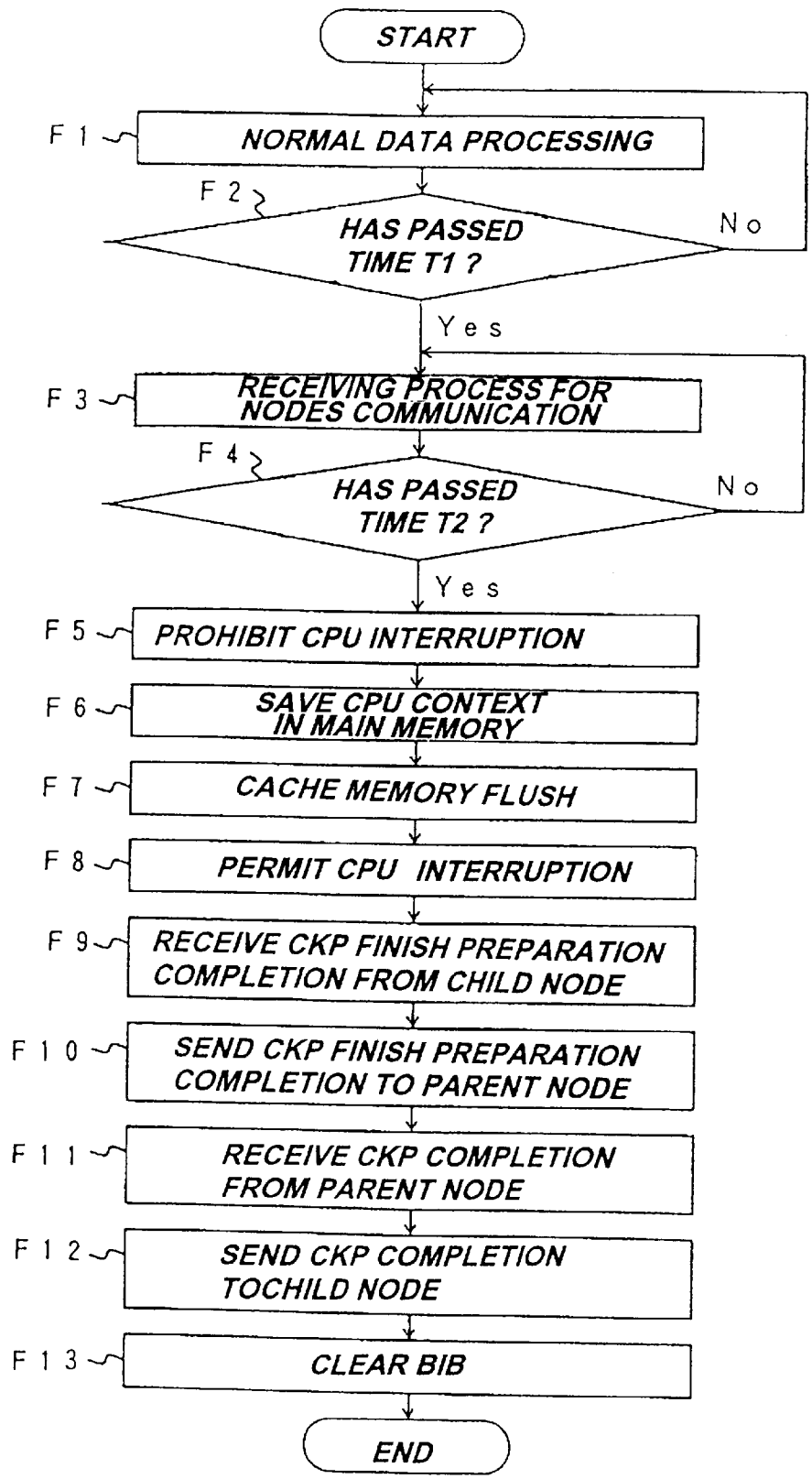
FIG. 7 is a flow chart for explaining the simultaneous checkpoint acquisition operation by the respective processor in the plurality of nodes.
Figure 8:
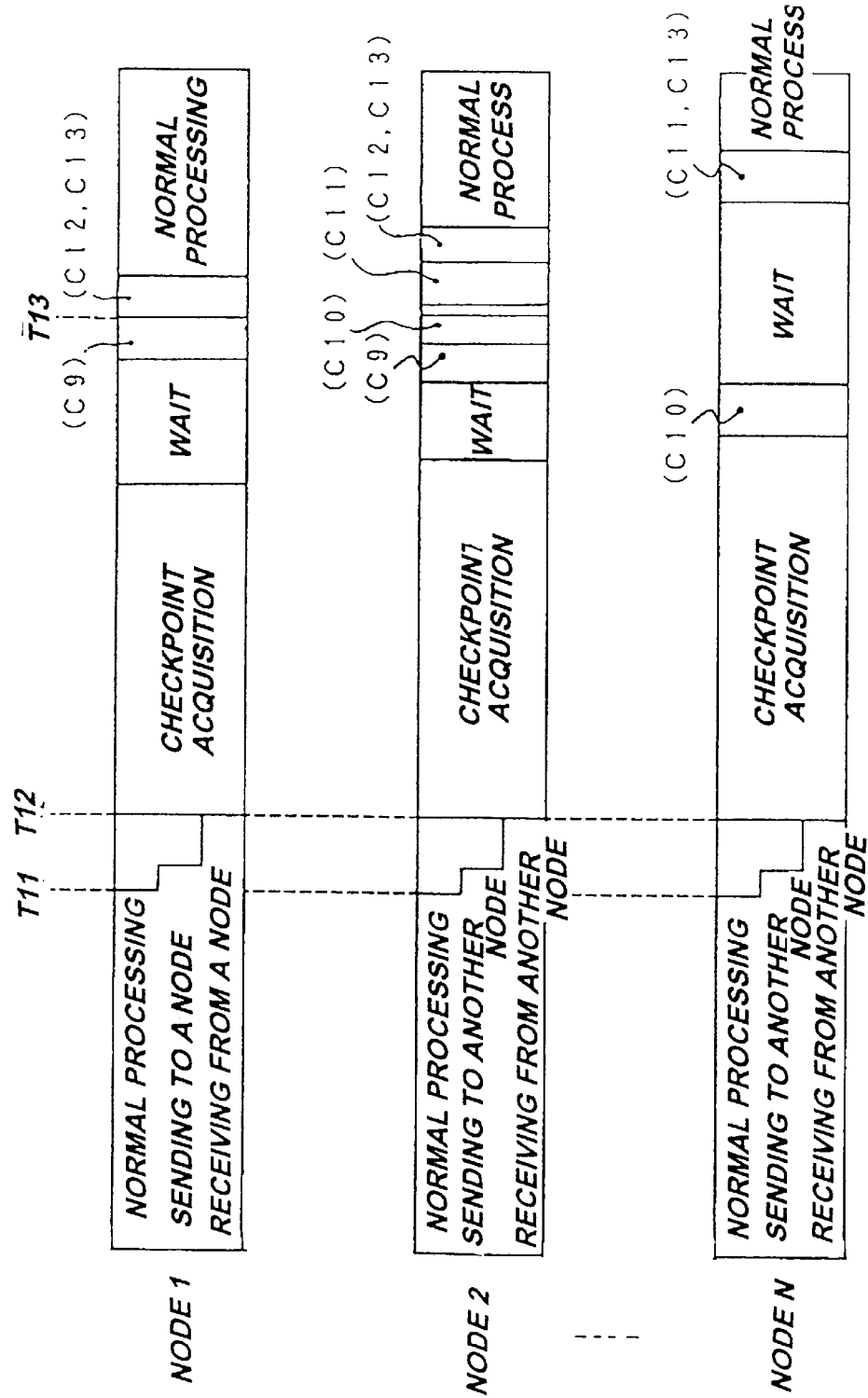
FIG. 8 is a time chart for explaining timings of the normal data processing and the checkpoint acquisition in a plurality of nodes 1, 2, . . . ,N.

FIG. 7 is a flow chart for explaining the synchronous acquisition of checkpoint at the respective CPU in all of nodes and FIG. 8 is a time chart for explaining the timings for a normal data processing and the timings for checkpoint acquisitions in a plurality of nodes.

Each of nodes stops a normal data processing until when the execution arrived at the time T11 (step F1). During that time, all requests for communicating among nodes are immediately executed and a received message from another node is transferred to the application in the received node without any delay.

Each of nodes stops the normal data processing when the execution arrived at a predetermined execution time T11 (step F2). During the time interval from the time T11 and the time 12, it is not generally executed to transfer a message to another node. However, since the activation of the communication adapter is executed under prohibiting an interruption of the CPU, there is a possibility to happen to receive a request message from another node after the time 11. In such a case, the received communication message is executed and finished it until the time T12 (Steps F3, F4). In this case, although the received message is stored in the receiving buffer in the associated main memory in the receiving node, the received application does not enter to the CPU for preventing from beginning a normal data processing.

The CPU in the respective nodes is prohibited to interrupt when the processing arrived at the time T12 (step F5). This makes sure for flushing of a cache memory.

At the time T12, all of nodes store the context in the CPU, i.e.,, the content in the respective register, into the respective main memory and then each of the cache memories is flushed (steps F6, F7). After that, the CPU is released from the prohibition of interruption (step F8).

Lastly it is necessary to synchronously finish the respective checkpoint acquisition in all of nodes. The completion of the checkpoint acquisition is performed by clearing the content in the respective BIBs. Because that the checkpoint acquisition time in the respective nodes is different with each others, all of nodes can not roll back to the same checkpoint if a fault occurs before that all nodes clear the content in the respective BIB.

In the first embodiment according to the present invention, all of nodes in the distributed memory type multiprocessor computing system are related so as to construct a tree structure. All of nodes having the same relationship of a root node and a child node transfer message information relating to both of completion of preparation for the checkpoint acquisition and of completion of the checkpoint acquisition synchronously among them. The completion of preparation for the checkpoint acquisition represents that the BIB is a just before state for cleaning its content by finishing of the cache flush.

Each of the nodes in this embodiment of the system are logically corresponded to the respective nodes of a binary tree as shown in FIG. 9(a). The node 1 is corresponded to the root node of the tree and the nodes 2 and 3 are respectively correspond to a child node of the root node 1. In general, nodes 2n and 2n+1 are corresponded to a root node n.

When a cache memory in a node finishes its flush, the associated CPU is admitted to make an interruption (FIG. 7, step F8) and enters to a waiting state for receiving information as to the completion of preparation for the checkpoint acquisition from a child node in the binary tree (FIG. 7, step F9). If there is no child node, this step can be deleted.

The node which received the information transfers the information of the completion of preparation for the checkpoint acquisition to a root node (FIG. 7, step F10). The node 1 does not this operation because it does not have a root node. As shown in FIG. 9(b), the information as to the completion of preparation for the checkpoint acquisition is successively transferred from a child node to a root node. When the nodes 1, 2 and 3 have received the information, the completion of the cache flush in all of nodes are assured.

After that, now, the node 1 delivers an instruction for completing the checkpoint acquisition to its child nodes. As depicted in FIG. 9(c), the instruction for completing the checkpoint acquisition is transferred from a root node to its child node successively. A node which sends a completion of preparation for a checkpoint acquisition waits an instruction for completing the checkpoint acquisition. The node which received the instruction from the root node send a completion message of the completion of the checkpoint acquisition to its child nodes (FIG. 7, steps F11, F12).

The nodes which received the instruction for completing the checkpoint acquisition clears a content in the BIB and restarts a normal data processing (FIG. 7, step F13).

In order to start a next checkpoint acquisition synchronously, it need to decide the times T11 and T12, The node 1 instructs the completion of the checkpoint acquisition by using these times as a parameter.

The first embodiment of the multinode computer system according to the present invention can effectively complete the checkpoint acquisition synchronously by successively transferring information among nodes which have a root-child relationship of a logical binary tree, If the system includes nodes of the number of 1023, the information transaction can be achieved by transferring a message upward at 9 stages and also by transferring a message downward at 9 stages.

It is also possible to make a node construction so as to correspond to a general tree construction having more than two child nodes.

Further it is also possible for each of nodes to restart a normal data processing with executing the steps F9–F12 when the step F8 in FIG. 7 has finished in order to increase the performance of the system. For doing so, another mechanism for restarting a normal data processing is needed. For example, in case of a multiprocessor construction, it can achieve by proving two BIBs in the node. In case of a single processor, it becomes possible by writing back a portion of content in the BIB into the main memory when a processing rolls back to a checkpoint.

The operation for synchronously starting a normal data processing in each of all processors when all of nodes have completed the checkpoint acquisition is refereed to as a barrier synchronization. It can achieve by using a hardware of wired AND. FIG. 10(a) shows such a multiprocessor computing system using the wired AND. FIG. 10(b) depicts a logical relationship between a node and the wired AND. In case of this construction, when the CPU in each of nodes becomes a state that is just before completion of a checkpoint acquisition, the corresponding AND input becomes "1". When the output from the wired AND changed from "0" to "1", it is recognized that all of nodes have completed the checkpoint acquisition. And each of nodes restarts a normal data processing by clearing the content in the respective BIB.

With referring to FIGS. 10 to 13, the construction having two BIBs is explained. Each of CPU in the respective node uses a BIB table for deciding which BIB should be used. The BIB table is provided, for example, in the bus controller (not shown in Figs.). The BIB table maintains relationship between the CPU ID number and the current BIB number which is used at that time by the CPU. The current BIB number "0" means to use of BIB 6a and the current BIB number "1" means to use of BIB 6b.

Figures 10, 11:
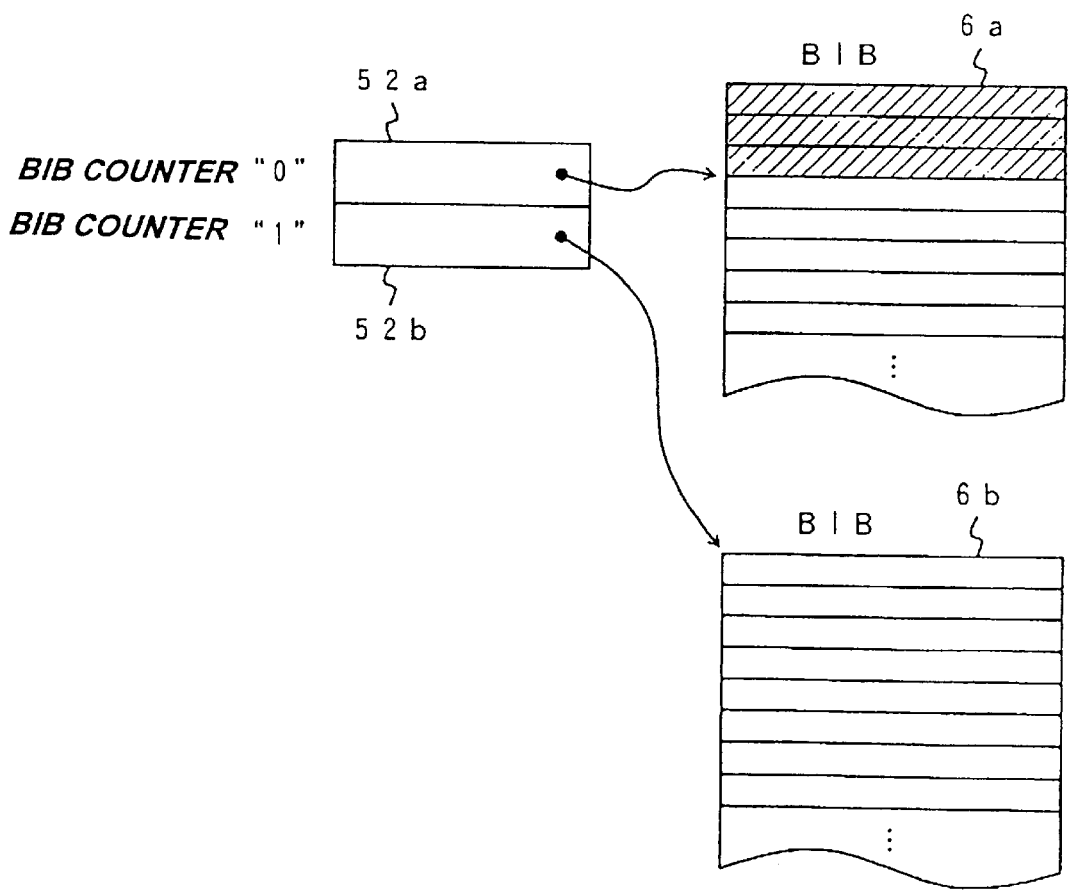
FIG. 10 is an example of a BIB table.
FIG. 11 shows the relations between two counters and the corresponding BIBs.

FIG. 11 shows a relationship between the two BIB counters 52a, 52b and the two BIBs 6a, 6b.

The BIB counter 52a keeps a pointer for designating a storing position of renewal history information. A value of the pointer increments the BIB address by +1 from the top address towards to the end address with every writing of the renewal information into the BIB 6a. The BIB counter 52b also keeps a pointer for designating a storing position of renewal history information. A value of the pointer increments the BIB address by +1 from the top address towards to the end address with every writing of the renewal information into the BIB 6b.

During a normal data processing, each of CPUs transfers the information comprising or the ID of the CPU, the memory address and the memory data to a bus controller when it needs to write data into the main memory.

When the bus controller detects a write request from a CPU, the controller decides which BIB is used for the request with depending upon the ID of the CPU. In this example, the bus controller derided to use the BIB 6a. As the renewal history information, the memory address and the data which has been stored at the memory address before the renewal are recorded in the BIB at a position which corresponds to the value in the BIB counter 52a. After then, the main memory is renewed.

When a predetermined time has passed or when the remaining capacity of the BIB 6a is lower than a predetermined value, each of CPUs starts a checkpoint acquisition process. The CPU detects such conditions by an interrupt signal from the bus controller or a polling process.

During the checkpoint acquisition process, data, such as a value in a register or content data in a cache memory which are necessary for recovering contents in the CPU but not yet written into main memory, are written into the main memory through the bus controller. The renewal history in this case is also recorded into the BIB 6a.

When the CPU has finished until this process, it restarts a normal data processing immediately after rewriting the current number of the BIB table from "0" to "1" in order to change the using BIB.

By changing the using BIB to another one, it can restart a normal data processing without any destroy of data which have been stored in the used BIB so far. Accordingly, each of CPUs can restart a normal data processing when it completed the checkpoint acquisition process by itself. Consequently, it can extremely reduce the total waiting time in the system.

Figure 12:
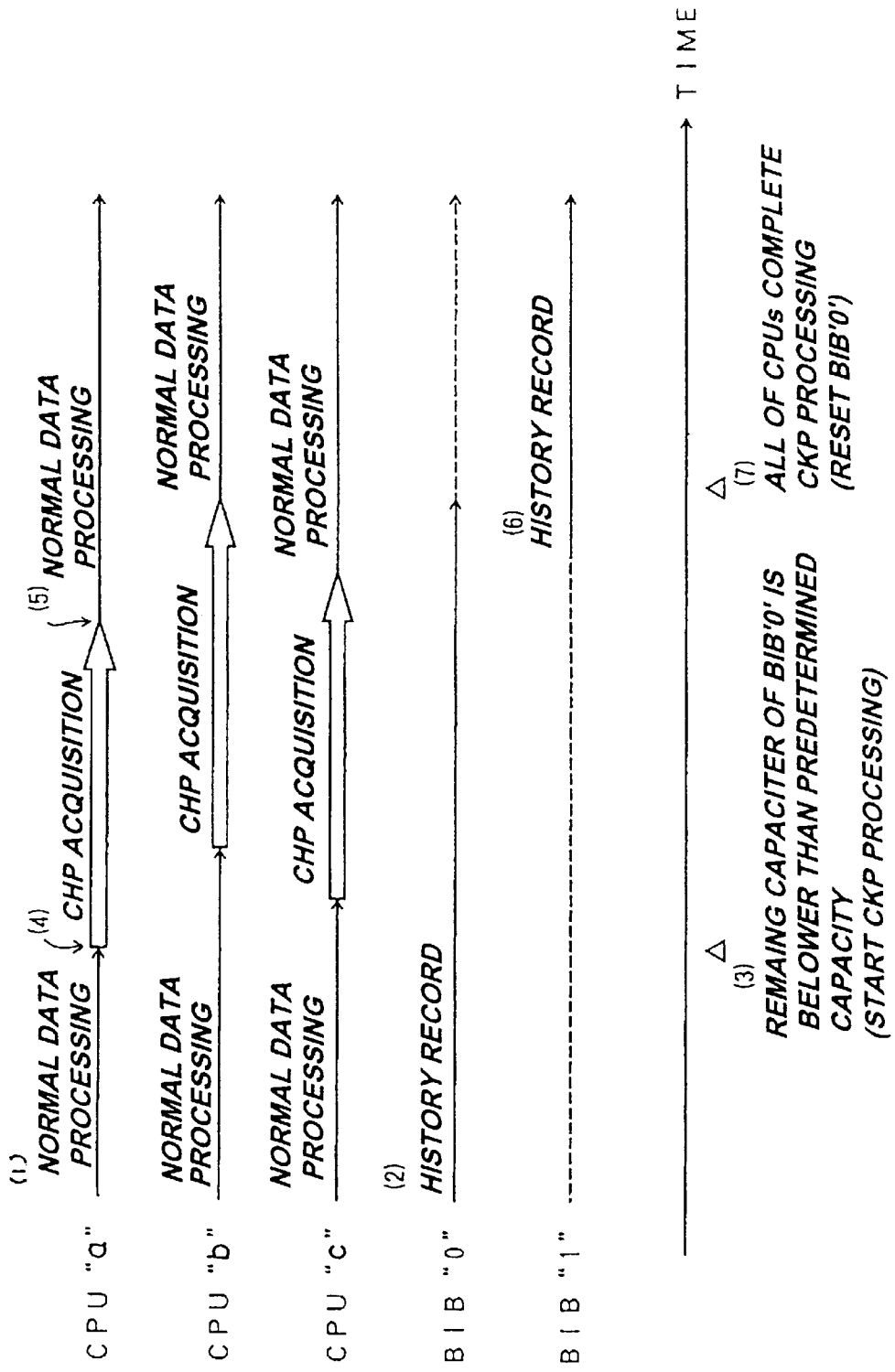
FIG. 12 is a time chart for explaining total operations for acquiring checkpoint in a multiprocessor computing system.

FIG. 12 explains the total flow of the checkpoint acquisition process.

The CPUa, CPUb and CPUc are executing a respective normal data processing in parallel (1). During these processes, the BIB 6a is used (2). When the remaining capacity becomes below the predetermined value (3), the respective CPU starts a checkpoint acquisition process by detecting the value.

However, the actual starting time of a checkpoint acquisition process for the respective CPU is different from the others with depending upon the kind of processing application or the cache memory state (4). Each of CPUs restarts a normal data processing immediately when the respective checkpoint acquisition process has finished by changing the using BIB from BIB 6a to BIB 6b (5). When the CPU restarts the normal data processing, the acquisition of the renewal history to BIB 6b is started (6). When all of the CPUa, CPUb and CPUc has finished the respective checkpoint acquisition process, the BIB 6a is reset for destroying the recorded renewal history (7).

Figure 13:
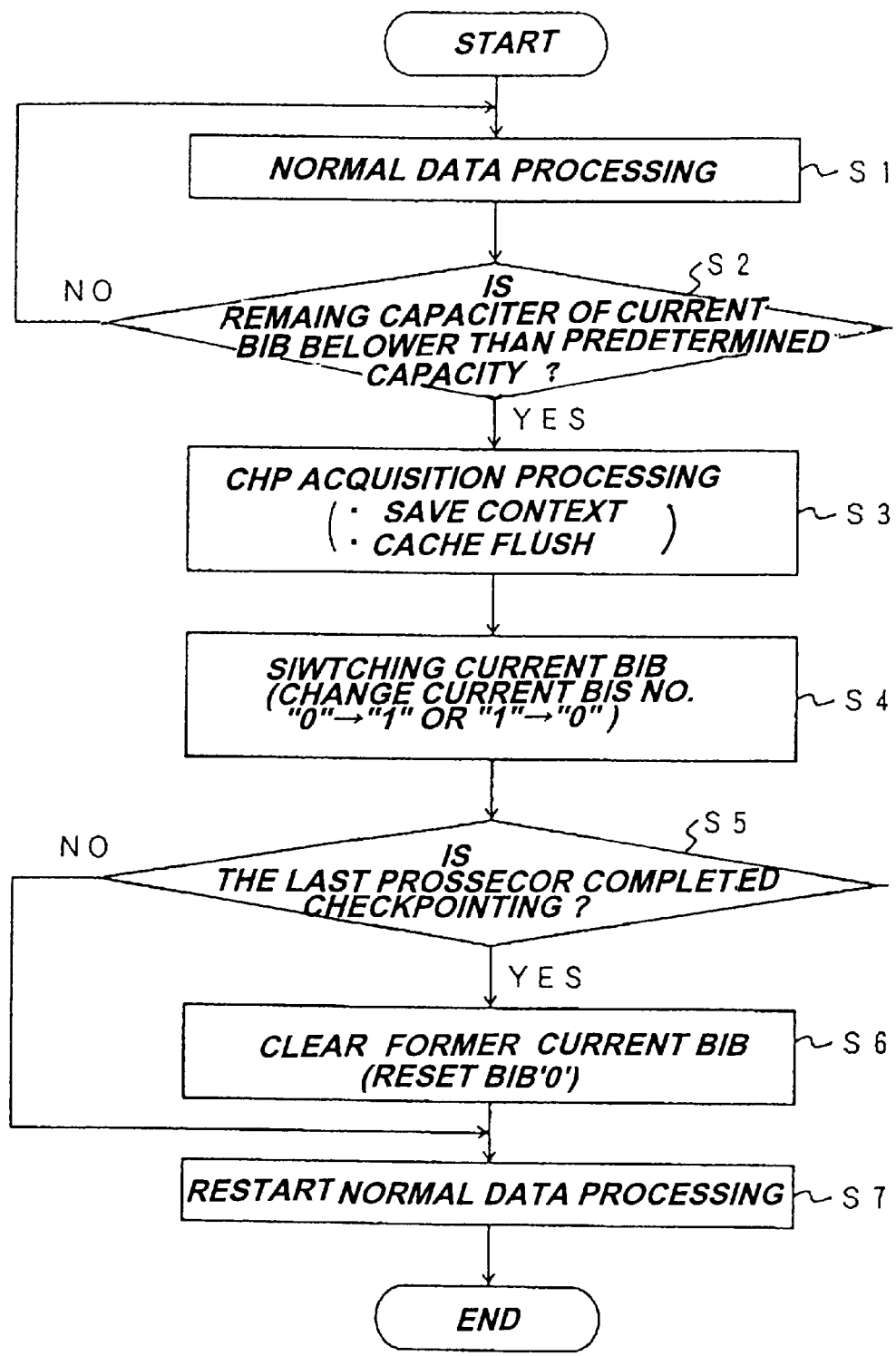
FIG. 13 is a flow chart for explaining a checkpoint acquisition process.

FIG. 13 explains the steps for executing the checkpoint acquisition process in the respective CPU.

During that each of CPUs is executing a respective normal data processing (step S1), when it detects that the remaining capacity of the current BIB becomes below than a predetermined size value (step S2), the respective CPU starts a checkpoint acquisition process (step S3). In the checkpoint acquisition process, the contexts in the CPU and the associated cache memory which has not yet reflected are written into the associated main memory. Then the CPU changes the current BIB number from "0" to "1" for switching the using BIB table (step S4). After this, the respective CPU checks whether or not the CPU itself is the last one which has finished the checkpoint acquisition process among the plurality of CPUs (step S5). This is done by checking the BIB table for finding out whether any of another CPU has not yet changed the BIB number. If all CPUs other than that CPU have already changed the BIB number, the CPU is the last one for finishing the checkpoint acquisition process. In that case, the last CPU clears the contents in the BIB which is presently used and the point value of the BIB counter which is associated with the BIB becomes to "0" (step S6). After then, the CPU restarts the disconnected normal data processing (step S7).

It is not necessary to use two physical BIB memories, but is possible to use one physical BIB memory as two logical BIB memories.

Figure 14:
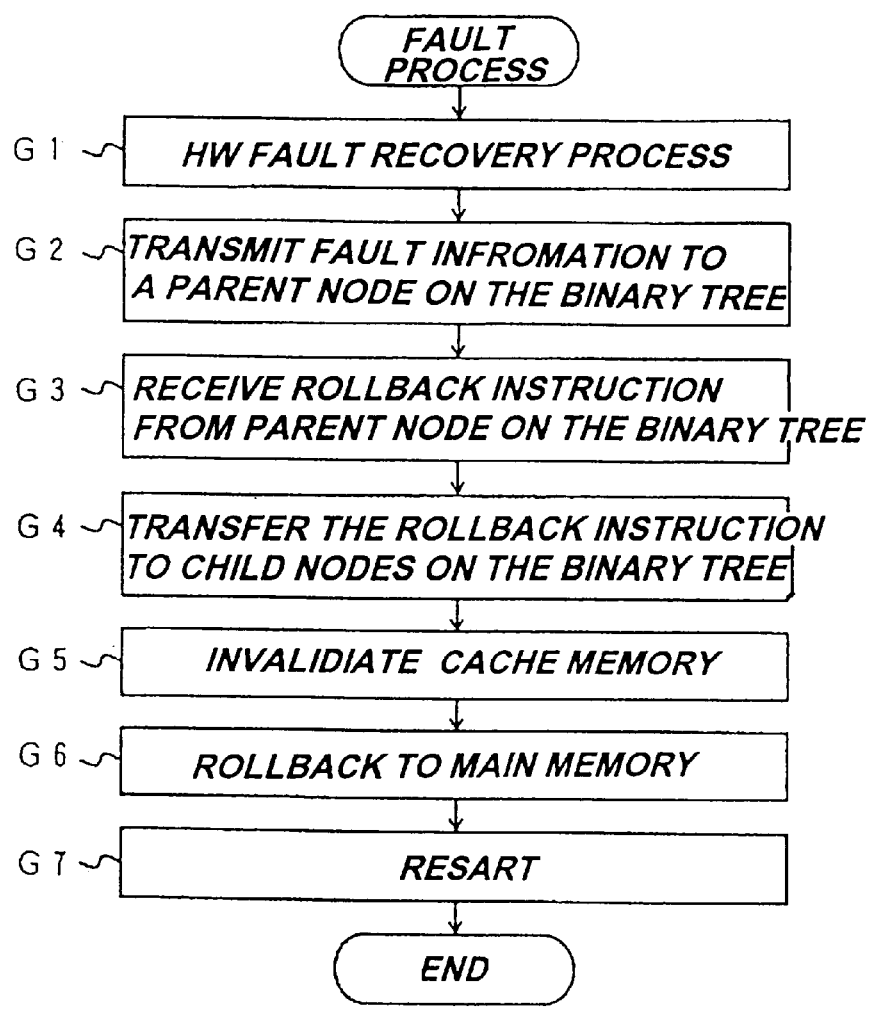
FIG. 14 is a flow chart for explaining restart operation by rolling back to a checkpoint.

As explained above, if a fault occurs in a node, all of nodes rolls back to a previously acquired checkpoint and restarts the data processing. FIG. 14 explains the operation by supposing that the node can recover from tho fault by rolling back and restarting operation. In case of that the node is completely broken down by the fault and can not recover the fault by rolling back, it is better to reset the total system of the multiprocessor.

As explained In FIG. 4, step E6, when a node detects a fault occurrence in the process or receives a fault signal from another node, the node enters to a recovering process by activating the fault dealing means.

If a fault occurred in the node, the node take necessary measurements for a recovery, for example, by resetting the faulted hardware (step G1). Then, it transfers a notice of the fault occurrence to a root node on a binary tree (step G2). As shown in FIG. 15(a), the notice of the fault occurrence is successively communicated to its root node from a fault node F to a final root node 1 on the binary tree.

When a plurality of faults occur at the almost same time in the tree construction of nodes as shown in FIG. 15(b), a root node 2 will receive double information for occurrence of fault at the almost same time. In this case, the rool node 2 transfer only one information of the received fault information.

With trouble taking place in any node in any group, all the nodes in other groups suspend data transmission to channel and, if necessary, initialization is made upon completion of receiving data whose transfer by way of the channel is in progressing so that no data arranged in communication may be found on the channel.

All the nodes in the group containing the node in which the trouble takes place restart the ordinary data processing after each of them rolls back to the check point just before it. Thus, an acquisition of the check point in synchronism with each of node group gets enabled.

By means of acquiring the check point in synchronism with node group as one unit in the above-mentioned manner, it becomes possible that commencements of acquring check points get synchronous with each other between the nodes and that processing overhead for commencement of the ordinary data processing after the acquisition of the check point is minimized.

The method, described in the embodiment Nos. 1–4, may be applicable to how to communicate data for acquiring the check point in an adequate manner with one another.

The present invention has to make a replacement with the node, incorporated in the conventional distributed memory type multiprocessor system, which is equipped with check point/roll back mechanism, but its practically advanced application may be extended up to the above-mentioned conventional distributed memory type multiprocessor system with using possibility of the channel (communication switch 10) for connection between the nodes, as attainable without modification of the channel. The distributed memory type multiprocessor system according to the present invention enhances highly its reliability in use for the wide application scope including the large-scaled scientific and technical calculations or database processing.

Upon receiving of notice representing trouble occurrence, the node 1 issues roll back instructions to the child node. The node receiving the roll back instructions from the parent node at the binary tree (Step G3) transmits the roll back instructions the child node (Step G4). As shown in FIG. 15(c), a sequence of transmitting the roll back instructions from the node 1 to the child node will be in turn performed.

The node receiving the roll back instructions invalidates cash memory (Step G5), rolls back main memory in reference with content of BIB (Step G6), and restarts the ordinary data processing from the check point (Step G7).

With trouble taking place at any node during period of acquiring check point, the notice of incurring the trouble is sent to other node with timing for transmitting and receiving completion of readiness for completing check point as proper. In that case the trouble occurrence is finally informed to the node 1. The roll back instructions are informed from the node 1 to the child node and also for the node just before clearing the content of BIB the roll back toward check point located at second position taken inversely from the above-mentioned node is performed.

Depending upon kind of trouble, no continuance of all the data processing may be effective at the node incurring the trouble. In that case, to detect occurrence of the trouble, monitor of time-out related to reception of notice about completion of readiness for completing acquisition of check point from the child node by the parent node is needed, because no notice about the completion of readiness for completing the acquisition of check point is not informed from the above-mentioned node incurring the trouble to the corresponding parent node.

By means of resetting the child node incurring the trouble from the parent node, if reaction of CPU for the child node is possible again, the above-mentioned recovery processing becomes usable.

To sum up, the first embodiment has been described to cover the construction and the method for permitting all the nodes to acquire the check points such that these nodes are operative in a synchronous manner, to enable transmission to other node to be suspended during each acquisition, thereby avoiding occurrence of any unfinished state at the communication switch 10 and communication adapters 1-2, 2-2, . . . N-2, and to restart the ordinary data processing, even when there takes place any trouble at some node, by means of rolling back the node incurring the trouble to the check point just before the second node next to the node incurring the trouble in an opposite direction, whereby the communications between the nodes can be executed without any delay.

A description of the second embodiment is provided as follows:

The description of the first embodiment is limited to the case where each of nodes 1, 2, . . . N without any exception commences to acquire check point, providing that a predetermined time has been fully past.

A description of the second embodiment is concerned with a method for commencing the acquisition of the check point in a synchronous manner, taken by any of nodes, no matter how variously they may be changed, with a remaining quantity of BIB reduced less than the predetermined value. In that case, the node whose BIB's remaining quantity becomes less than the predetermined value may be referred to called "node of demanding check point processing commencement."

Due to the rough similarity between the second embodiment and the first embodiment, the following description of the former embodiment is confined to the part only where there are differences therebetween in getting its focus as concise as possible. The constructional fact of the first embodiment, where each node takes logically a one by one adaptation correspondingly to the node at the binary tree, may be true of that of the second embodiment.

As shown in FIG. 16(a), the node of demanding check point processing commencement (node 5) sends a demand for instructing the commencement of check point acquisition to the parent node (node 2), which sends in turn the demand therefor to its another parent node (node 1) upon its receipt of the demand, thereby establishing informed conditions of the demand for instructing the commencement of check point acquisition onto the node 1.

To make communications along a shape of the binary tree might aim at prevention of a multiplicity of nodes from sending the demand for instructing the commencement of check point acquisition to the node 1.

Further to instructions of acquiring check points which are sent to nodes in order of the nodes 2 and 3 by the node 1, FIG. 16(b) illustrates completion of establishment of informing the check point acquiring instructions to all the nodes along the shapes of binary trees.

Figure 17:
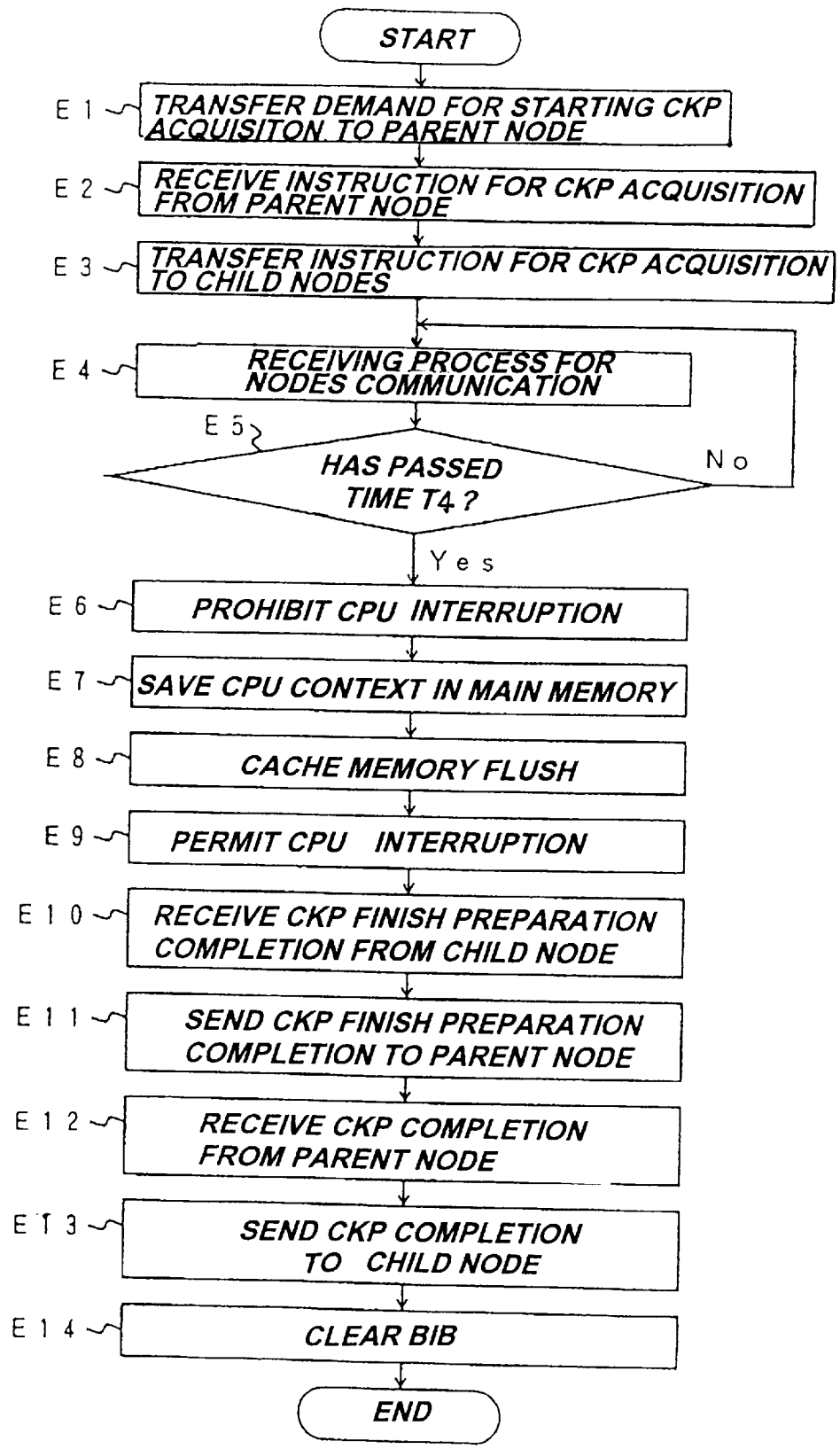
FIG. 17 is a flow chart for explaining an operation of the node which received a start request instruction for a data acquisition.

With the remaining quantity of BIB reduced less than some threshold value or upon receipt of the demand for instructing the commencement of check point acquisition from the child node, each node is led to perform such a processing as shown by flow-chart of FIG. 17.

First of all, a node falling under the pertinent conditions sends the demand for commencing check point acquisition to the parent node (Step E1). An exception is, however, applicable to the node 1, which does not proceed to this step, because it has no parent node.

Upon completion of sending the demand for commencing check point acquisition to the node 1, the node 1 sends instructions of acquiring the check points to the nodes, i.e. the nodes 2 and 3 (Step E2). In that case further exception is applicable to the node 1, which does not proceed to this step due to the same reason for Step E1.

Each of the nodes 2 and 3 sends the instructions of check point acquisition, which is sent from the node 1, to its own child node (Step E3). A sequence of triggering each node to proceed to the steps including the Step E2 and the Step E3 is in a position to complete informing processes of instructions of acquiring the check points to all the nodes.

While interrupting the ordinary data processing, each node keeps processing of reception of the communications between the nodes prior to settlement of time at T4 (Steps E4 and E5). That is because there is a necessity for its reception of all the communications between the nodes, plausible occurrence of the communications between the nodes, involved in the ordinary data processing, being available before full access of instructions of check point acquisition to the node corresponding to the leaf of the binary tree.

It is preferable that the time T4 should be determined at the execution of the Step E3 by the node 1.

A settlement of the time at T4, which brings in turn data for communications between the nodes into empty on the channel (communication switch 10), will allow synchronous processing for the acquisition and the acquisition completion of the check points to be performed in the same manner as found in the Steps F5–F13 of FIG. 7 (Steps E6–E14). For detailed description see Steps F5–F13 which constituting partially flow-chart of FIG. 7 having its descriptive illustration represented previously, these steps specifying the same steps as applicable to the above-mentioned synchronous processing for execution.

According to the second embodiment a tentative description sheds a light upon the sequential process from a transmission of the demand for instructing the commencement of the check point acquisition to the root node (node 1) as shown in FIG. 16(a) to a issuance of the instruction of acquiring the check point from the root node, an alternative method other than the above-mentioned sequential process being able to be executed.

As shown in FIG. 16(c), a recommendable method among method candidates may be in use for sending the instructions of acquiring the check points to all the nodes with a primary process of sending the instructions of acquiring the check points from the node of demanding for commencement of processing the check point, which has completed detection of the remaining quantity of BIB to get less than the threshold value, (node 5 in FIG. 16(c)) to the parent node and all the child nodes and subsequently a second process of allowing these nodes, which completed reception of the instructions of acquiring the check points as mentioned above, to send such instructions of acquiring the check points to their own parent nodes and all the other child nodes, being executed altogether.

In the above-mentioned case when receiving instructions of acquiring the check point from any node, it is needed to perform 2 processes as follow:

(F1) Do not send instructions of acquiring the check point to the node acting as a role of transmitting the instructions of acquiring the check point; and (F2) With over 2 units of instructions of acquiring the check point received, disregard instruction, received after second instruction, of acquiring the check point.

Thus, a description of the method according to the second embodiment is completed to specify the method in use for equipping all the nodes with the check points with synchronous movement applied to these nodes under a state of incurring no communication between the nodes after informing demand for commencement of check point processing to all the nodes, providing a necessity of commencing the check point acquisition takes place at any node, namely the remaining quantity of BIB becomes less than the predetermined value.

Here proceeds to a description of 3rd embodiment as follows:

While the second embodiment takes an assumption that at the Step E5 of FIG. 17, to perform the processing for reception of the communications between the nodes which may be incurred before the instructions of acquiring the check point reach the node corresponding to the leaf of binary tree, a wait is kept until the time becomes T4, the 3rd embodiment is concerned with a method for performing the communications between the nodes at higher tact with need for keeping wait prior to T4 reduced to nil.

According to the 3rd embodiment an assumption is made to read that the communications adapters 1-2, 2-2 . . . N-2 are furnished with the following functions:

(G1) CPU for each node can set reception refusing mode in use for the communications adaptor for the node.

(G2) If the communications adaptor for A is started as well as the communications adaptor for node B is set at reception refusing mode so that data transmission may be done from the node A to the node B, an actual situation triggers no communications and the communications adaptor for the node A permits interruption of the communication adaptor therefor into CPU for the node A to fulfill the adaptor's role of informing completion of error and cause for such a completion.

Figure 18:
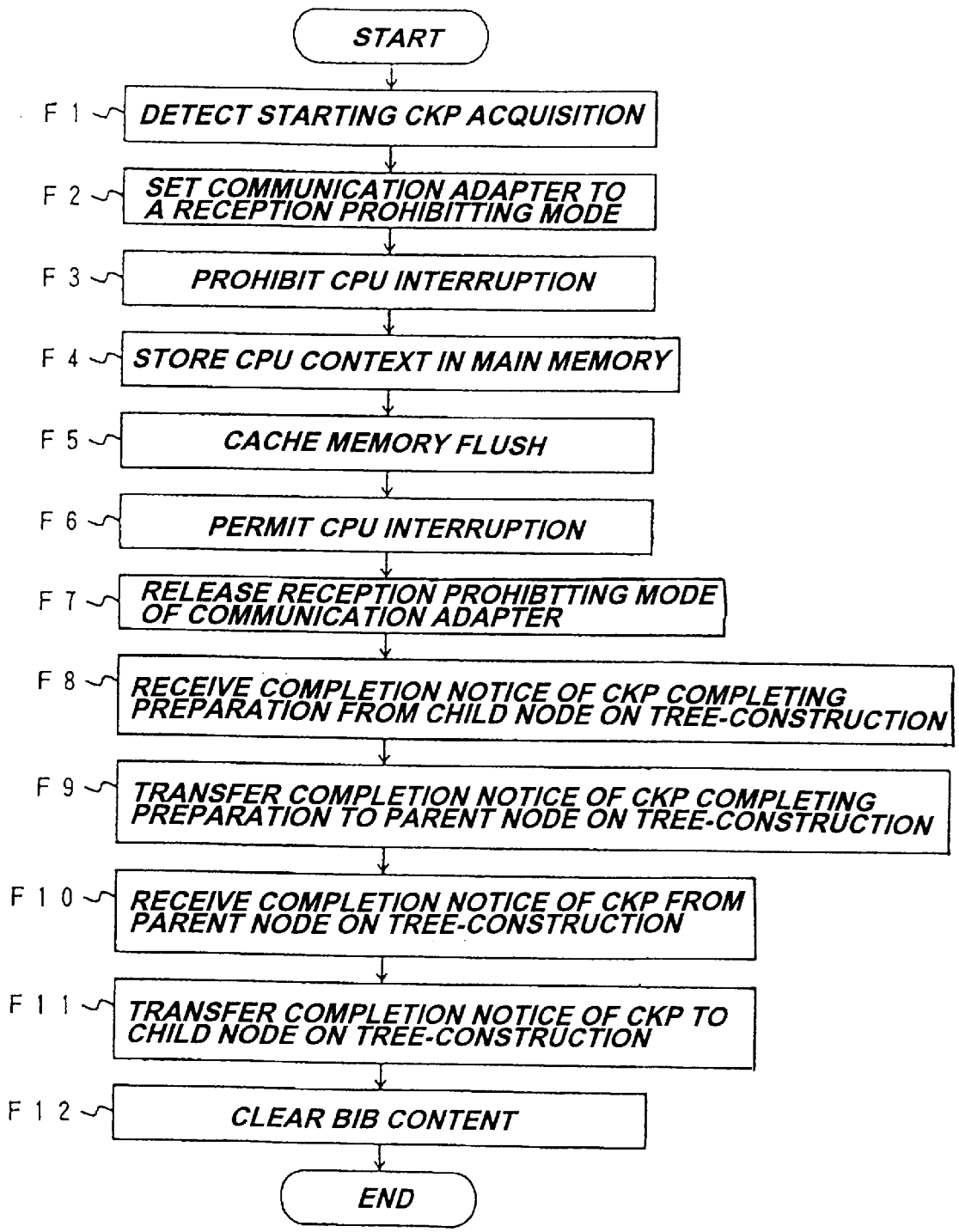
FIG. 18 is a flow chart for explaining a synchronized starting operation of the checkpoint acquisition among the nodes.

With the communications adapters 1-2, 2-2, . . . N-2 furnished with the above-mentioned functions (G1) and (G2), changes in method for placing of commencement of acquiring the check point into synchronism between the nodes, shown by flow-chart of FIG. 17, and in method for operating the transmission side (transmission controlling section) for the communications between the nodes are made in such manners respectively as shown in FIGS. 18 and 19 to minimize waiting time after completion of issuing the check point acquisition instructions through the parent node.

When commencing the check point (Step F1), each node sets the communications adaptor to reception refusing mode (Step F2).

Under the circumstances the node A prepares transmission message (Step G1), starts the communications adapters (Steps G2–G4) and is led to be going to perform the data transmission to the node B (Steps G5–G6). On the other hand, the node B sets the communications adaptor to the reception refusing mode for commencement of acquiring the check point (Step F2).

Figure 19:
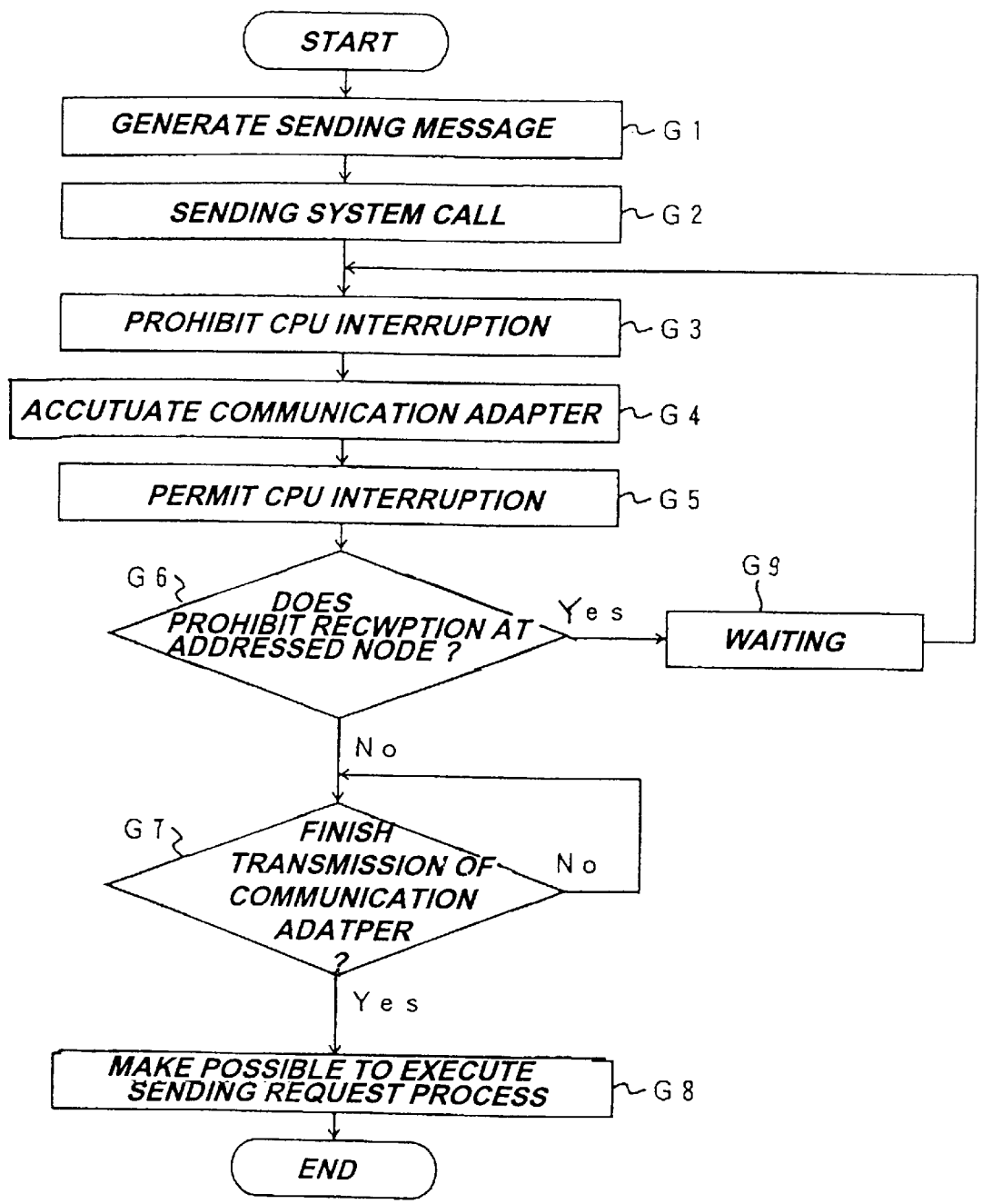
FIG. 19 is a flow chart for explaining an operation of a transmitting side during the communication between the nodes.

In that case, the node A detects that the communications adaptor for the partner is set to the reception refusing mode, located at the Step G6 of FIG. 19, resulting in transmitting no message to the node A for the predetermined period (Step G9).

Usually, since instructions or acquiring the check point is sent also to the node A during the above-mentioned waiting period, the ordinary data processing is suspended and the check point acquisition comes to be commenced.

Thus, a description has been completed to cover unnecessity for waiting during the predetermined period before the communications between the nodes in response to the ordinary data processing becomes nil with regard to commencement of acquiring the check point, if it is possible for the communication adaptor to set the reception refusing mode.

The method according to the 3rd embodiment may be applicable to that of the embodiment and in the applicable case, it becomes unnecessary to continue the reception processing for the communications between the nodes before passing time makes access to T2 in the Step F3 and the Step F4 of FIG. 7.

Next, a description of the 4th embodiment is made as follows:

While the 3rd embodiment is described to cover the unnecessity for waiting during the predetermined period before the communications between the nodes in response to the ordinary data processing becomes nil with regard to the commencement of acquiring the check point, if the communications adaptor can set the receipient refusing mode, the method according to the 4th embodiment is described to enable the waiting during the predetermined period not to be needed, even if there is no function of setting the reception refusing mode in the communications adaptor.

Figure 20:
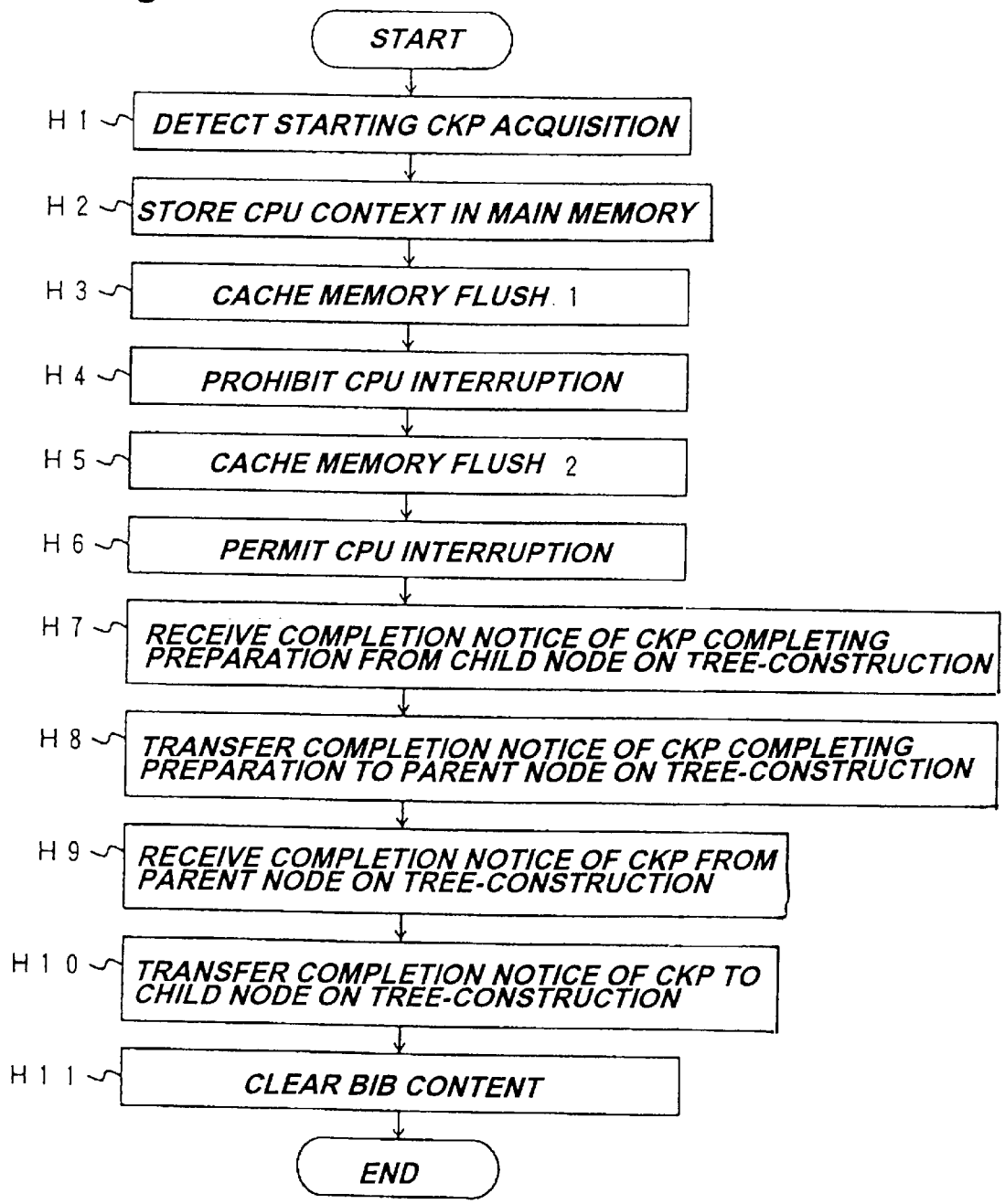
FIG. 20 is a flow chart for explaining a synchronized starting operation of the checkpoint acquisition among the nodes.

As shown in the flowchart of FIG. 20, when commencing the check point (Step H1), the processing for saving the context of CPU onto the main memory (Step H2) and the cash memory flash 1 (Step H3) are performed under a state or allowing the cpu interruption. The cash memory flash 1 means the processing of flashing partially the cash memory only.

The above-mentioned arrangement causes the demand for receiving the data, as interruption from the communications adaptor, to be informed to CPU, when the data transmission from other node is performed during the execution of the Step H2 or the Step H3.

Figure 21:
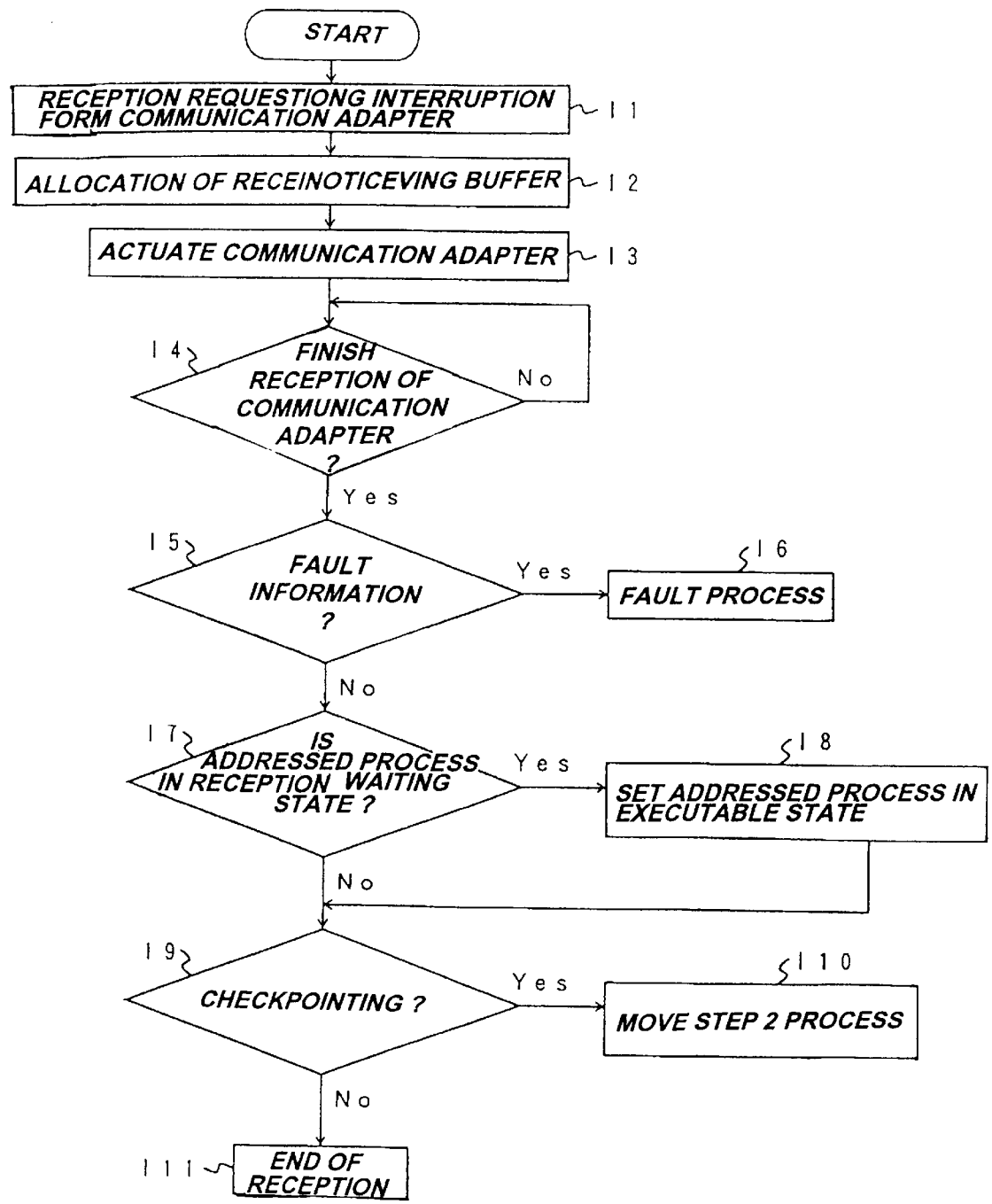
FIG. 21 is a flow chart for explaining a receiving operation during a communication between the nodes.

In that case CPU for the node on the receiving side executes the reception processing for communications between the nodes as shown by flow-chart of FIG. 21. During the middle course of cash memory flash, the CPU for the node on the receiving side is in a position to own a probability of getting rewritten data available, also in a part where the cash memory flash 1 has completed the cash memory to be flashed, by means of processing an interruption from the communications adaptor (Step 12–14).

Such a resulting probability leads the node on the receiving side to check if the check point acquisition is in operating at occurrence of interruption into the receiving demand at the Step 19 after the processing for received message (Steps 15, 17, and 18). If so, the node on the receiving side proceeds back to the processing at the Step H2 of FIG. 22(b) for starting again the check point.

This method is based on the way of thinking in which it may be practically more proper to execute again flashing of the cash memory, only if there is found an arrival of the message while executing the flashing of the cash memory to some extent with assumption given to unavailability of such an arrival, than to keep a waiting under a state of getting existence of the arrival not clarified. The method may expect improvement in performance of overall portions of the system.

According to the 4th embodiment, with arrival of the message found, an description covers that an attempt at re-execution of processing for saving the context in CPU onto the main memory is made at the Step H2, while method for saving the context in CPU may sometimes make it needless to what was saved prior to message arrival. Namely, depending upon when the context is saved, for example when commencement of acquiring the check point upon the interruption from the communications adaptor is made further to reception of the message of acquiring the check point, if in initiation of such a commencement content of register at the data processing ordinary to the data is saved, without necessity for changing the prior data by way of saving again the context, a method for utilizing the data, which have not been treated, is also available for practical adoption.

A description of the fifth embodiment is to be made as follows:

With the check point/roll back system of computer, since major portion of time required for check point acquisition is consumed by flashing of the cash memory, 2-phase type check point is in use for system for reducing substantially the required time. In that case the cash memory is assumed to be copy-back model.

As shown in FIG. 22(a), the conventional check point system performs a repeated process In order to point check processing, ordinary processing, check point processing . . . , the overhead of which comprises check point processing/(ordinary processing+check point processing). In terms of time the most proportionally occupied portions among the requisite for the check point acquisition include time for re-writing (flashing) the renewed data on the cash into the main memory.

To shorten "time for re-writing (flashing) the renewed data on the cash into the main memory", the time of which occupies proportionally larger portion among the overhead, the following steps are needed to perform 2-phase type check point processing. FIG. 22(b) illustrates timing diagram of action executable by the 2-phase type check point system.

(H1) Ordinary data processing (H2) first phase: Executes the cash flash in parallel with the ordinary data processing, using the cash flash unit, and (H3) second phase: Executes the cash flash of the cash memory without proceeding to the ordinary data processing, after saving the context of CPU onto the main memory, by using the cash flash unit.

The first phase, where the cash flash is executed, while performing the ordinary data processing, reduces very much at the commencement of the 2 phase quantity of data which ought to be re-written from the cash memory to the main memory. For this reason, the time required for the second phase, where the ordinary data processing may not be executable, is in a position to be reduced.

Figure 23:
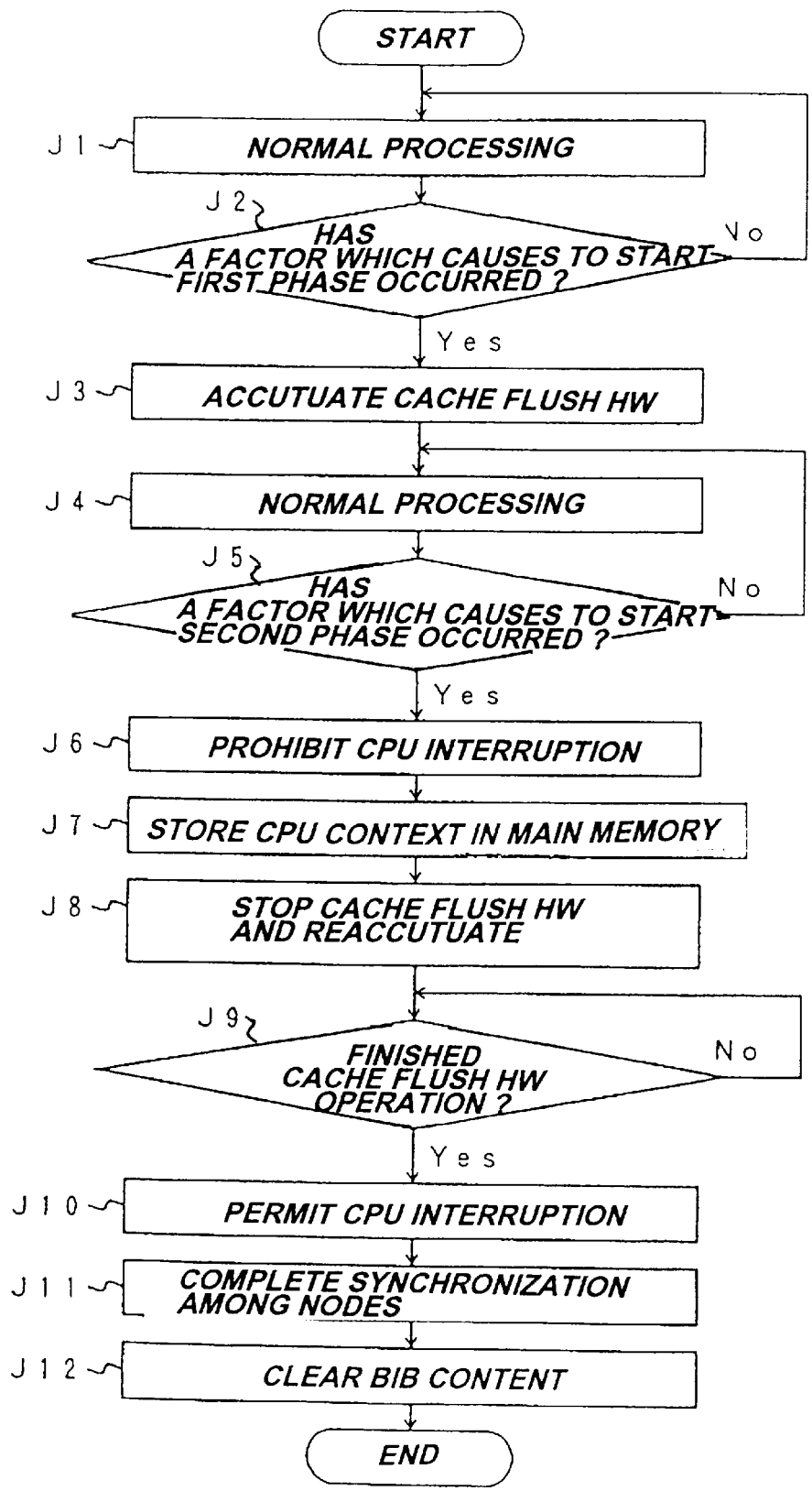
FIG. 23 is a flow chart for controlling a cache flush device for performing the two phased checkpoint operation by a node.

According to the fifth embodiment a description covers a case of adopting the computer, which uses the above-mentioned 2-phase check point system as each node in the distributed memory type multiprocessor system:

FIG. 23 illustrates a method for controlling the cash flashing device with purpose for allowing each node to perform 2-phase check point.

If any factor to trigger a necessity for commencing the first phase is generated, when executing the ordinary data processing, (Steps J1 and J2) the cash flashing hardware, namely the cash flashing device is started (Step J3), whereby the cash flashing device is actuated for cash flashing purpose in parallel with the performed ordinary data processing (Step J4).

At that time if an occurrence of a factor to need the commencement of the 2 phase (Step J5), without performing of the ordinary data processing together with CPU interruption prohibited, the context of CPU is saved onto the main memory (Steps J6 AND J7). After that the cash flashing device is stopped and re-started, objective to be cash-flashed being returned to entire portion of the cash memory, whereby the cash flashing device executes the cash flashing at the second phase (Step J8 and J9). The 2 phase gets entire portion of cache memory, even as the objective, included into portion not to complete to be re-written at the first phase and data renewed during the execution of the first phase only, so there is a small amount of data to need to be re-written at most. For this reason, the time taken by un-enabling the ordinary data processing to be executed is minimized.

Upon completion of causing the cash flashing device to perform the cash flashing process, further to permitting of the CPU interruption, the completing synchronous operation between the nodes is performed, BIB is cleared and return to the ordinary data processing is carried out. (Steps J10–J12)

Such a method as described previously with regard to the first embodiment may be applicable to a synchronism between the nodes for completing the check point, whose necessity is demanded at the Step J11. The method may attain no only a probability of causing a reduction in the time required for the check point acquisition by itself to be operatively associated with another reduction in the time for un-enabling the ordinary data processing, namely the time for un-enabling the communications between the nodes, but a probability of getting speed of communications between the nodes as high as possible with help from the present invention, in which all the nodes are operated in a synchronous manner for the check point acquisition, thereby executing the demand for the communications between the nodes as immediately as such a demand is issued.

Timing for making a shift to the first phase and the second phase, namely judgment conditions at the Step J2 and the Step J5, may include a couple of candidates for that respect.

The methods to be adopted by the Step J2 include an independent method for allowing each node to judge by itself whether any of the following conditions (I1)–(I3) is satisfactorily established and an informative method for getting a detection of satisfactory establishment of the following conditions (11)–(13) by any node known to other node.

(I1) Predetermined time has been passed since recommencement of the ordinary data processing by each node.

(I2) Quantity of data, which need writing of the cash memory, becomes over than threshold value.

(I3) Remaining quantity of BIB becomes less than threshold value.

The methods to be adopted by the Step J5 include an independent method for allowing each node to judge by itself whether the following conditions (J1)–(J2) have been satisfactorily established and an informative method for getting a detection of satisfactory establishment of the following conditions (J1)–(J3) by any node known to other node.

(J1) Predetermined time has been passed since the commencement of the first phase by each node.

(J2) The cash flashing device completed inspection of all the cash blocks and the rewriting of the pertinent data into the main memory.

Which of the above-mentioned candidates is the most suitable is subject to content of data processing at each node so that it is relatively preferable if choice can be made in a manner of trial and error.

Such methods as described for the embodiments 1–4 may be applicable to those for informing the conditions (I1) to (I3) and (J1) to (J2) to other node by the communications between the nodes.

Thus, the description has been completed to cover the case where the 2-phase-check-point type computer is used.

Next, a description of example of applying the present invention to case where nodes in the distributed memory type multiprocessor system are grouped is made: With a plurality of applications executed in the distributed memory type multiprocessor system, it may be sometimes operative to execute any of applications whose difference is subject to each group, into which a plurality of nodes in the system are logically classified.

Figure 24:
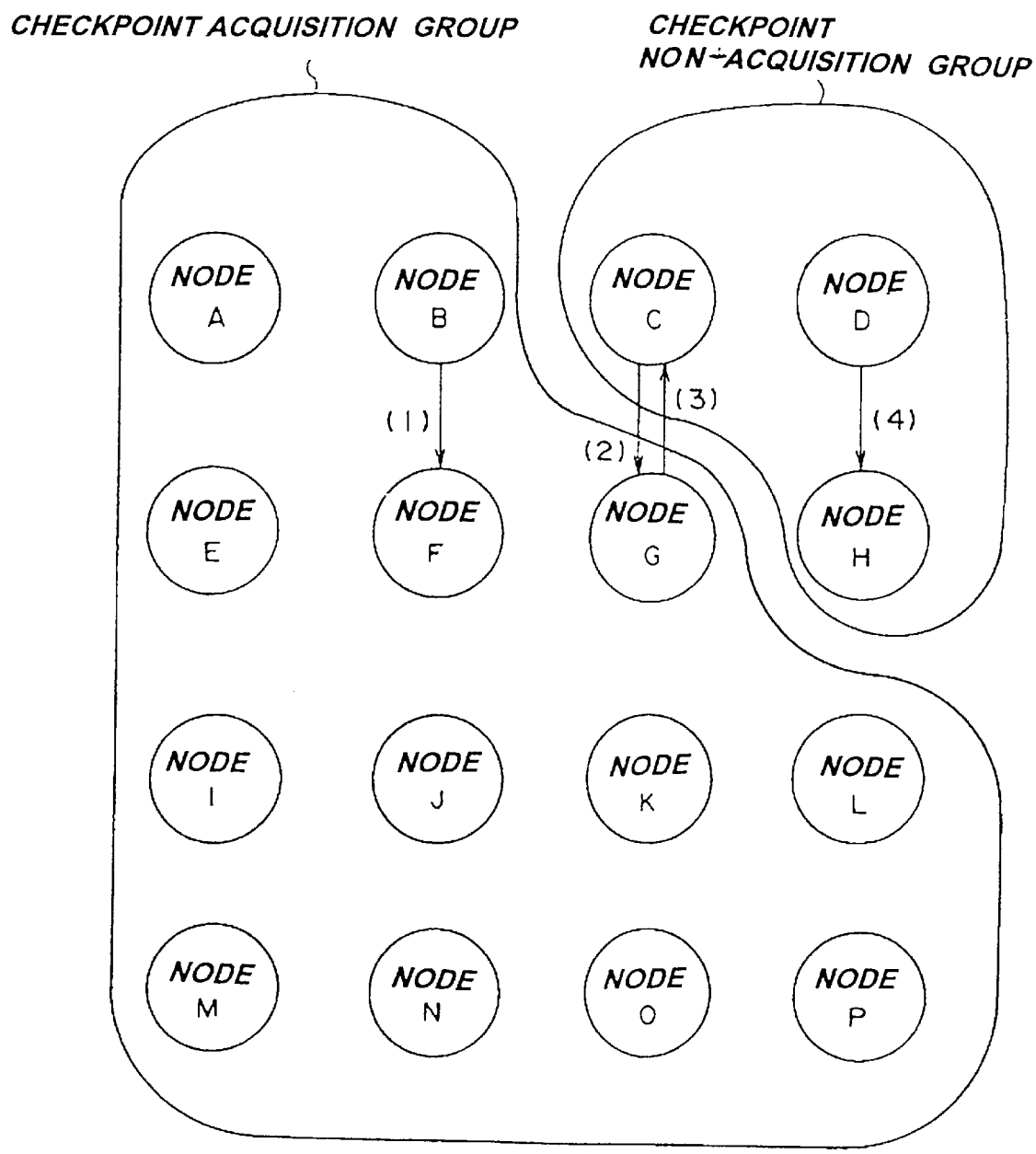
FIG. 24 is a conceptional view for explaining an example of grouping a plurality of nodes A–P into the checkpoint acquisition/non-acquisition groups.

FIG. 24 illustrates conceptually a situation of grouping a plurality of nodes. The nodes are connected to one another by way of channels (not shown) and it is possible to send and/or receive data among them.

Take for example, a descriptive focus is put on case where integrity consists of a large-scale data base system, which accepts enquiry services from a lot of remote controls, and a decision making support system, which makes reference to the data base. In that example, the data base system ought to avoid stop of the services due to operative suspension of the computer, while any relatively serious influence may not be given to the decision making support system, even when re-execution from the primary position becomes needed due to the operative suspension of the computer.

In order that the distributed memory type multiprocessor system acquires the check point, an arrangement is made such that at the nodes in groups of executing the database system the check point is acquired, while at (a few units of) nodes of executing the decision making support system the check point is not acquired.

An assumption is made such that the node instructed to acquire check point is regarded as an acquiring node, and the node not instructed to acquired check point is regarded as a non-acquiring node. Namely, according to FIG. 24, the nodes (i.e. nodes B and F) included into the check point collecting group (database system) are the acquiring nodes and the nodes (i.e. nodes C and H) included into noncollecting group of the check point (decision making support system) are the non-acquiring nodes.

The present embodiment is adapted to be equipped with means of selecting either of causing each node to acquire the check point or not to acquire the check point, namely of setting each node either to the check point acquiring node or to non-acquiring node of the check point for selection, depending upon each node as a unit, between acquiring node of and non-acquiring node of the check point.

With the distributed memory type multiprocessor system whose construction consists of the above-mentioned mixture among the acquiring nodes of the check point and the non-acquiring nodes of the check point, the following communications between the nodes take place.

(K1) The communications between the nodes in group of executing the database system (of collecting the check point)

(K2) The communications between the nodes following the transmission for inquiry from the decision making support system (non-collecting group of the check point) to the database (K3) The communications between the nodes following the transmission of result exchanged from the database to the decision making support system (K1) is concerned with, for example, the data communication (1) from the node B to the node F of FIG. 24. At (K1) the data communications are suspended, when acquiring the check point, while the check point collection is performed in a synchronous manner within the check point collecting group, thereby enabling the data communications without delay. It is possible to suspend the data transmission at the acquisition of the check point and the check point can be acquired in a state where there are no data in transit through the channel.

(K2) is concerned with, for example, the data communications (2) from the node C to the node G as shown in FIG. 24 and during the period of acquiring the check point only on the side where the database is executable the data transmission is suspended.

(K3) is concerned with, for example, the data communications (3) from the node G to the node C as shown in FIG. 24 and the data communications (3) have 2 operative modes, in which only check point collecting group is rolled back or only non-collecting group of the check point is re-booted. Since contradiction may sometimes take place between states of both the groups, the data communications (3) are delayed until the subsequent check point is completed.

If trouble is generated at the node in the group of executing the database system (the non-acquiring node), all the nodes in the above-mentioned group are returned to the check point just before position of facing the trouble for recommencement of the ordinary data processing, while the node of executing the decision making support system (the non-acquiring node) continues to perform the ordinary processing.

If trouble is generated at the node of executing the decision making support system (the non-acquiring node), rebooting is performed to execute again usually the decision making support system from its starting position. The node of executing the decision support system (the non-acquiring node) continues to perform the ordinary processing.

Thus, the mixed location of the check point acquiring node and the non-acquiring node of the check point, set node by node, in the distributed memory type multiprocessor system may be in a position to built up the check point/roll-back system of the distributed memory type multiprocessor system, which may be effectively operative.

Figure 25:
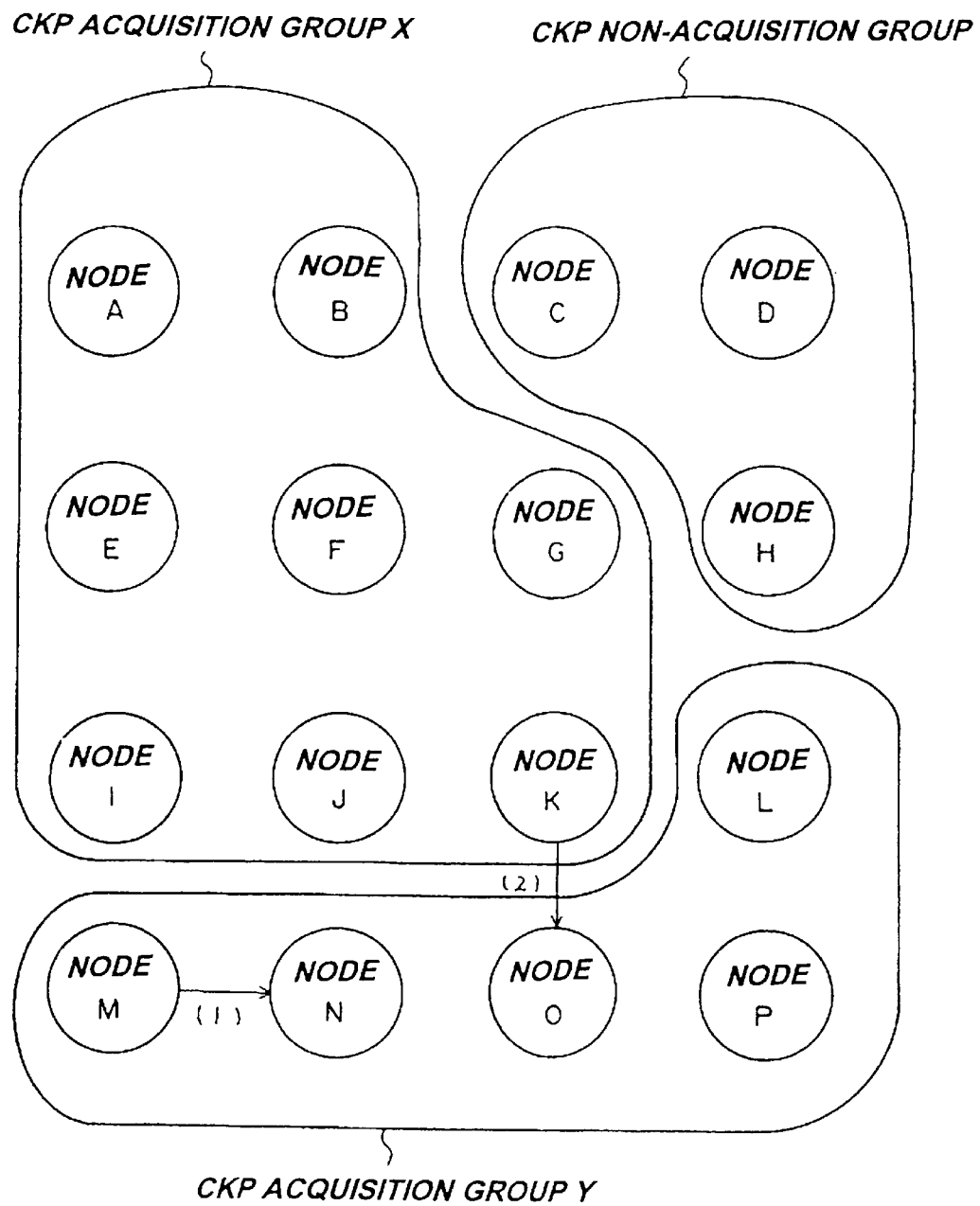
FIG. 25 is a conceptional view for explaining another example of grouping a plurality of nodes A–P into the checkpoint acquisition/non-acquisition groups.
Figure 26:
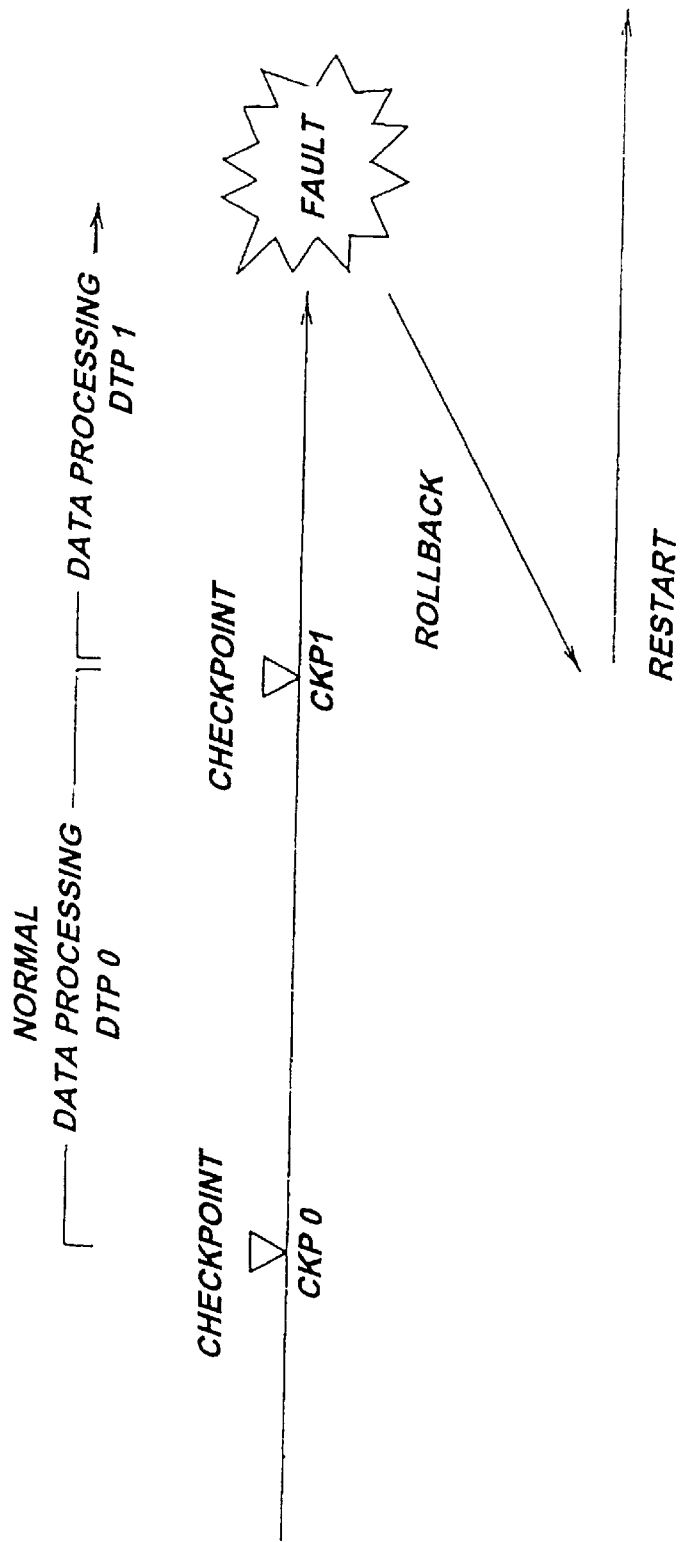
FIG. 26 is a conceptional view for explaining a basic theory of the checkpoint/rollback operation.
Figure 27:
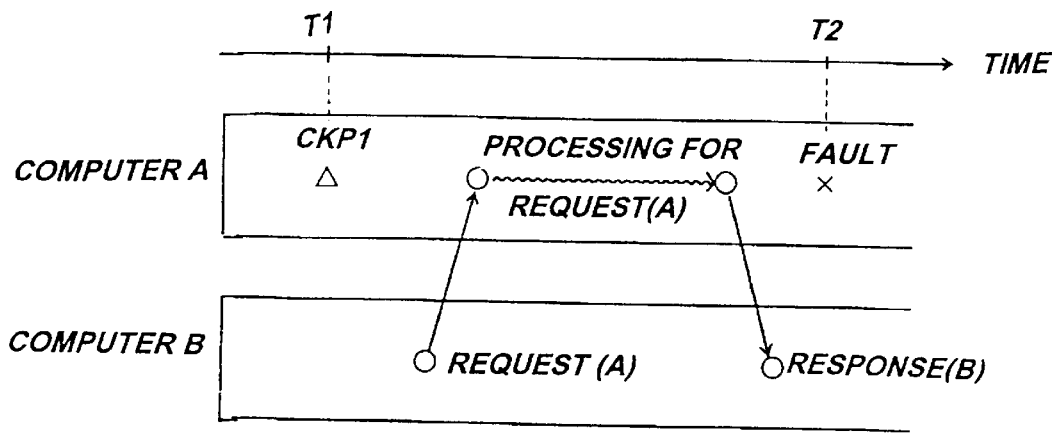
FIG. 27 is a conceptional view for explaining an example defect causing to an immediate data transaction during a communication processing between the two nodes (computers A and B).
Figure 28:
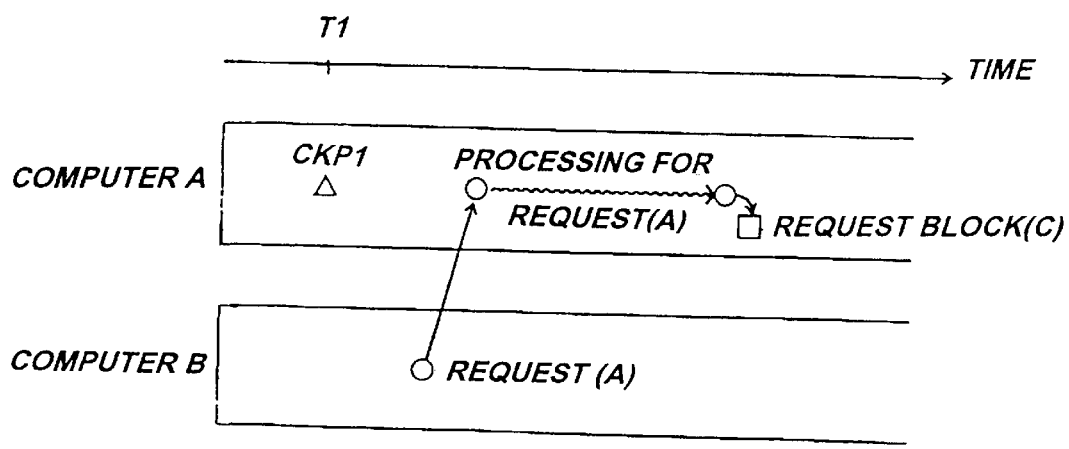
FIG. 28 is a conceptional view for explaining a delayed data transaction in a communication processing between the two nodes (computers A and B).
Figure 29:
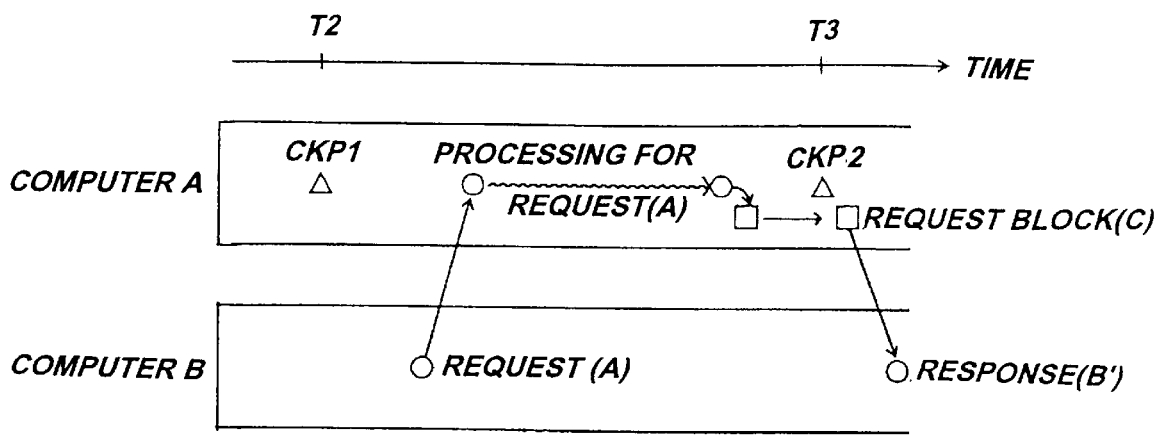
FIG. 29 is a conceptional view for explaining an example of checkpoint acquisition after delaying data transaction in communication processing between the two nodes (computers A and B).
Figure 30:
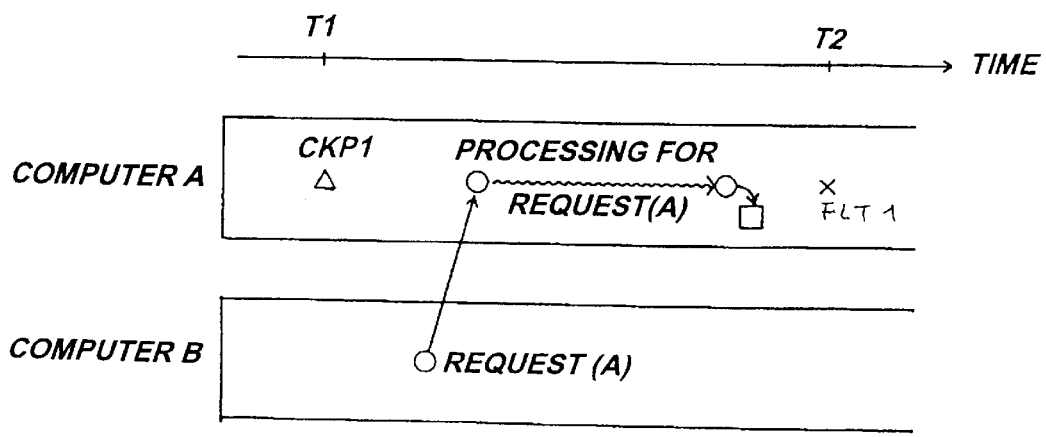
FIG. 30 is a conceptional view for explaining fault occurrence after delaying data transaction in a communication processing between the two nodes (computers A and B) checkpoint rollback system.

Next, a description of the case, where the node groups are allocated to the above-mentioned large-scale database system and the order issuing and receiving management system, which makes a reference even to the database, and while the check point is node group by node group being acquired, the check point processing is executed, is to be made as follows:

As shown in FIG. 25, for example, assumption is made such that a plurality of nodes, connected by way of channels to one another, are grouped into 3 units of groups, while at the node group of one check point collecting group X, the large-scale database system comes true, at the node group of another check point collecting group Y, the order issuing and receiving management system comes true, and the non-acquiring group of the check point is also provided. In that case, the check point acquisition is node group by node group is executed in a synchronous manner.

To perform the above-mentioned execution, the data communications are often generated within not only the group of executing the database system but also the group of executing the order issuing and receiving management system. The data communications between the nodes in both the groups might be estimated to be generated lees frequently. From that view, instead of acquiring the check point among all the nodes in both the groups in a synchronous manner, when acquiring the check point, the synchronous operation is triggered within each of the groups, but it is not triggered between both the groups.

As shown in FIG. 25, for example, when each node of some group is acquiring the check point, the node of other group performs by way of the channel the data communications to other node. For example, when at the check point collecting group X, the check point is being acquired, the node M of the check point collecting group Y performs the data communications (1) to the node N.

On the other hand, the data transmission (2) between the nodes of different groups, for example, the data transmission (2) at the node K and the node O is delayed until the subsequent check point acquisition is completed.

What is claimed is:

1. A distributed memory type multiprocessor computing system, comprising:

a plurality of nodes; and a communication path for commonly coupling the plurality of nodes with each other for transferring message;

each of the nodes including:
 at least one processor;
 an associated main memory; and
 an associated cache memory for using an execution of checkpointing and roll back recovery when a fault is detected during a normal data processing;

said nodes are arranged so as to correspond to a tree construction for performing synchronous checkpointing among the nodes by successively transferring information between a pertinent parent node and a corresponding child node under the tree construction transmission for synchronously starting checkpointing at all of the nodes;

the information is delivered from a node which detects a necessity for commencing a check point acquisition by transmitting a demand for commencement of said check point acquisition to a corresponding parent node;

the parent node which receives said demand successively transmits in turn said demand to a root node of the tree construction; and said root node instructs to start the check point acquisition to all child nodes.

2. A distributed memory type multiprocessor system, as defined in claim 1, wherein:

said node which detects necessity for commencing said checkpoint acquisition transmits said demand for checkpoint acquisition both to a pertinent parent node and to all of the pertinent child nodes; and nodes which received the demand transfer the received demand to all of the pertinent parent node and child nodes excepting the demand transferring node for establishing the synchronous checkpoint acquisition at all of said nodes.

3. A distributed memory type multiprocessor system, as defined in claim 1, wherein:

said each of nodes includes a copy back type cache memory and a main memory for storing an acquired checkpoint; and said each of nodes compulsory rewrite back dirty data in said cache memory onto said main memory before acquiring said checkpoint in synchronous with all said other nodes.

4. A distributed memory type multiprocessor system, as defined in claim 1, wherein:

each of said nodes commences checkpoint acquisition at a predetermined time interval for synchronously commencing check point acquisition at all of the nodes.

5. A distributed memory type multiprocessor system, as defined in claim 1, wherein:

each of said nodes performs data transmission with the pertinent nodes on a tree construction for synchronously completing checkpoint acquisition among the associated nodes;

all parent nodes which received completing information for a checkpoint acquisition preparation from all of the pertinent child nodes transfers the information to a root node;

the root node instructs to start a checkpoint acquisition to all of the child nodes and executes checkpoint acquisition for itself when the root node received the information of completing preparation; and each of the nodes which received the instruction for starting of the checkpoint acquisition or a normal data communication from a node which restarted the normal data processing transfers the checkpoint acquisition completing instruction to all of the pertinent nodes and completes the checkpoint acquisition by itself for restarting the normal data processing.

6. A distributed memory type multiprocessor system, as defined in claims 1 or 2, wherein:

each of the nodes which is corresponding to a tree construction performs data transmission for establishing a synchronous checkpoint acquisition completion with the pertinent nodes;

said each of nodes prohibits data reception from another node upon a commencement of the checkpoint acquisition and permits data reception from another node at just before the completion of the checkpoint acquisition for restarting a normal data processing;

a node which receives a notice of completing preparation for a checkpoint completion from all the child nodes transmits the completing information of preparation for a checkpoint completion to a parent node;

a root node which receives said notice of completing preparation for a checkpoint completion from all said child nodes transmits a checkpoint completing instruction to all said child nodes and completes the checkpoint acquisition by itself with destroying a prior checkpoint; and a node which received the checkpoint completing instruction from the parent node or a normal data communication from a node which has restarted a normal data processing transfers the checkpoint completing instruction to all the pertinent child nodes and completes the checkpoint acquisition by itself with abandoning a prior check point.

7. A distributed memory type multiprocessor system, as defined in claims 5 or 6, wherein:

the root node detects a fault by checking a time interval for receiving the notice of completion of checkpoint completing preparation from the associated child nodes.

8. A distributed memory type multiprocessor system, as defined in claims 1 or 2, wherein:

each of the nodes has a self-identification means for setting as a checkpoint acquisition node or a non-acquisition node during a checkpoint acquisition operation;

a node which is identified as a checkpoint acquisition node prohibits data transmission to another node through a communication channel and completes reception of transferring data through the channel during the checkpoint acquisition;

a node which is identified as a non-acquisition node prohibits transmitting data to the checkpoint acquisition node through the channel and performs data processing synchronous with all of the other nodes, keeping no transferring data in the channel; and the checkpoint acquiring node prohibits data transfer in the communication channel and completes data reception through the channel, then restarts a data processing from a previously acquired checkpoint when a fault is detected.

9. A distributed memory type multiprocessor system, as defined in claims 1 or 2, wherein;

the plurality of nodes are grouped into several groups for executing different applications and each of the node groups acquire checkpoint acquisition, respectively;

nodes grouped into a group performs data transmission among the nodes in the same group during another grouped node acquiring a checkpoint;

data communication between nodes which are grouped in different groups is suspended until completion of a subsequent checkpoint acquisition; and when a fault is detected in a node, all nodes in the other groups are prohibited data transmission through the channel and are completed reception of data transfer through the channel so as to keep no data in the channel, and all nodes in the same group of the fault node restart restive data processing from a previously acquired checkpoint.

10. A distributed memory type multiprocessor system, comprising;

a plurality of nodes, each of nodes includes at least a processor, a main memory and a communication channel for coupling thereto, each of said node having means for acquiring checkpoint at a predetermined time interval so as to enable restarting a data processing from a previously acquired checkpoint when a fault is detected during the processing; and each of said nodes acquire checkpoints synchronously with all of the other nodes and keeps a checkpoint until a completion of a next checkpoint acquisition and fault information which is detected in a node is also synchronously transferred to the other nodes before acquisition of the next checkpoint;

whereby each of said nodes restarts normal data processing from a previously acquired checkpoint when nodes receive the fault information from one or more of the other nodes and when nodes receive other information than the fault information from one data communication between nodes which are grouped in different groups is suspended until completion of a subsequent checkpoint acquisition; and when a fault is detected in a node, all nodes in the other groups are prohibited data transmission through the channel and are completed reception of data transfer through the channel so as to keep no data in the channel, and all nodes in the same group of the fault node restart restive data processing from a previously acquired checkpoint.

11. A distributed memory type multiprocessor, comprising:

a plurality of nodes, each of the nodes including at least a processor, a main memory and a communication channel;

said node having;

means for acquiring checkpoints at a predetermined time interval so as to enable reexecution of a normal data processing when a fault is detected during the processing;

a first communication control means for controlling said communication channel so as to unenable said node to receive data from another node during a checkpointing for the node;

a second communication control means for checking whether an associated node for receiving a data transmission from said node is under an unenable state for receiving said data; and each of said nodes keeps an acquired checkpoint until all of said nodes complete a subsequent checkpointing and inform a fault occurrence in synchronous with the subsequent checkpointing to all of the nodes;

whereby said data communication is suspended during when said second communication control means detects that said associated node is prohibited to receive any data from another node.

* * * * *

UNITED STATES PATENT AND TRADEMARK OFFICE
CERTIFICATE OF CORRECTION

PATENT NO. : 5,922,078
DATED : July 13, 1999
INVENTOR(S) : Hideaki HIRAYAMA et al.

It is certified that error appears in the above-identified patent and that said Letters Patent is hereby corrected as shown below:

Claim 1, col. 22, line 25, "check point" should read --checkpoint--.

Claim 1, col. 22, line 27, "check point" should read --checkpoint--.

Claim 1, col. 22, line 31, "check point" should read --checkpoint--.

Claim 4, col. 22, line 57, "check point" should read --checkpoint--.

Claim 6, col. 23, line 39, "check point" should read --checkpoint--.

Claim 9, col. 24, line 2, "wherein;" should read --wherein:--.

Claim 10, col. 24, line 21, "comprising;" should read --comprising:--.

Claim 10, col. 24, line 30, "acquire" should read --acquires--.

UNITED STATES PATENT AND TRADEMARK OFFICE
CERTIFICATE OF CORRECTION

PATENT NO. : 5,922,078
DATED : July 13, 1999
INVENTOR(S) : Hideaki HIRAYAMA et al.

It is certified that error appears in the above-identified patent and that said Letters Patent is hereby corrected as shown below:

Claim 10, col. 24, line 40, after "one", insert --or more of the other nodes, the received nodes reexecute checkpoint acquisition.--.

Claim 10, col. 24, delete the text from line 41(beginning with "data communication . . .") to line 50 (ending with ". . . acquired checkpoint.").

Signed and Sealed this

Twenty-ninth Day of February, 2000

*Attest:*

Q. TODD DICKINSON

*Attesting Officer*  Commissioner of Patents and Trademarks